US012544675B2

(12) United States Patent
Liu et al.

(10) Patent No.: US 12,544,675 B2
(45) Date of Patent: Feb. 10, 2026

(54) DECISION MODEL TRAINING METHOD AND APPARATUS

(71) Applicant: Tencent Technology (Shenzhen) Company Limited, Guangdong (CN)

(72) Inventors: Ruochen Liu, Guangdong (CN); Qiyang Cao, Guangdong (CN); Sze Yeung Liu, Guangdong (CN); Liangpeng Zhang, Guangdong (CN); Zhengwen Zeng, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 295 days.

(21) Appl. No.: 18/207,312

(22) Filed: Jun. 8, 2023

(65) Prior Publication Data

US 2023/0311002 A1    Oct. 5, 2023

Related U.S. Application Data

(63) Continuation of application No. PCT/CN2022/129092, filed on Nov. 1, 2022.

(30) Foreign Application Priority Data

Jan. 20, 2022   (CN) .................. 202210067453.0

(51) Int. Cl.
*A63F 13/67*    (2014.01)
*A63F 13/58*    (2014.01)

(52) U.S. Cl.
CPC .............. *A63F 13/67* (2014.09); *A63F 13/58* (2014.09)

(58) Field of Classification Search
CPC .......... A63F 13/67; A63F 13/58; A63F 13/55; A63F 13/69; A63F 13/833; A63F 13/35; G06N 5/01; G06N 20/00
See application file for complete search history.

(56) References Cited

U.S. PATENT DOCUMENTS

| 10,576,380 B1 | 3/2020 | Beltran et al. |
| 2019/0111344 A1 | 4/2019 | Hiroki et al. |

FOREIGN PATENT DOCUMENTS

| CN | 109091868 A | 12/2018 |
| CN | 111111220 A | 5/2020 |

(Continued)

OTHER PUBLICATIONS

Office action in Chinese Application No. 202210067453.0, dated May 9, 2024, 16 pages (with English Translation).

(Continued)

*Primary Examiner* — Kevin Y Kim
(74) *Attorney, Agent, or Firm* — Crowell & Moring LLP

(57) ABSTRACT

A decision model training method and apparatus are provided. The method includes: obtaining a first model pool; inputting, in an $n^{th}$ iteration process, $i^{th}$ battle state data into an $n^{th}$ decision model to obtain an action instruction outputted by the $n^{th}$ decision model, the $i^{th}$ battle state data being for representing a battle state at an $i^{th}$ battle time in a battle process, and the action instruction being for instructing a first client to control a first virtual character to act and return $i+1^{th}$ battle state data collected by the first virtual character after acting; training the $n^{th}$ decision model based on battle state data in the battle process to obtain an $n+1^{th}$ decision model, the battle state data comprising the $i+1^{th}$ battle state data; and adding the $n+1^{th}$ decision model to the first model pool.

18 Claims, 11 Drawing Sheets

(56) References Cited

FOREIGN PATENT DOCUMENTS

| CN | 111282279 | A | 6/2020 |
| CN | 111330279 | | 6/2020 |
| CN | 112295237 | | 2/2021 |
| CN | 112633466 | A | 4/2021 |
| CN | 112870721 | | 6/2021 |
| CN | 113577769 | A | 11/2021 |
| CN | 113827946 | | 12/2021 |
| CN | 114404976 | | 4/2022 |

OTHER PUBLICATIONS

International Search Report issued Jan. 19, 2023 in International (PCT) Application No. PCT/CN2022/129092.

DECISION MODEL TRAINING METHOD AND APPARATUS

RELATED APPLICATION

This application is a continuation application of PCT Patent Application No. PCT/CN2022/129092, filed on Nov. 1, 2022, which claims priority to Chinese Patent Application No. 202210067453.0, entitled "DECISION MODEL TRAINING METHOD AND APPARATUS, COMPUTER DEVICE, AND STORAGE MEDIUM" filed on Jan. 20, 2022, wherein the content of the above-referenced applications is incorporated herein by reference in its entirety.

FIELD OF THE TECHNOLOGY

Embodiments of this disclosure relate to the field of artificial intelligence (AI), and in particular, to a decision model training method and apparatus, a computer device, and a storage medium.

BACKGROUND OF THE DISCLOSURE

In fighting games, in intelligent scenes such as novice tutorials and man-machine modes, virtual characters controlled by players may battle against a game AI with a certain policy and decision-making ability.

In the related art, supervised learning is usually used to train the game AI. That is, battle data generated by players in a game process is used to train and learn the game AI. However, in the training and learning process, due to the poor reliability of battle data of the players, it is easy to produce an over-fitting problem, which leads to a big difference between the actual performance and the expected value of the game AI, thereby causing a poor personification effect of the game AI.

SUMMARY

An embodiment of this disclosure provides a decision model training method and apparatus, a computer device, and a storage medium, which can improve the battle personification of decision models. The technical solution is as follows:

According to an aspect, this embodiment of this disclosure provides a decision model training method. The method is performed by a computer device. The method includes:

obtaining a first model pool, the first model pool comprising at least one decision model for indicating a battle policy adopted by a virtual character in a battle;

inputting, in an $n^{th}$ iteration process, $i^{th}$ battle state data into an $n^{th}$ decision model to obtain an action instruction outputted by the $n^{th}$ decision model, the $i^{th}$ battle state data being for representing a battle state at an $i^{th}$ battle time in a battle process, and the action instruction being for instructing a first client to control a first virtual character to act and return $i+1^{th}$ battle state data collected by the first virtual character after acting, n and i being a positive integer;

training the $n^{th}$ decision model based on battle state data in the battle process to obtain an $n+1^{th}$ decision model, the battle state data comprising the $i+1^{th}$ battle state data; and adding the $n+1^{th}$ decision model to the first model pool.

According to another aspect, this embodiment of this disclosure provides a decision model training apparatus. The apparatus includes: a memory operable to store computer-readable instructions and a processor circuitry operable to read the computer-readable instructions. When executing the computer-readable instructions, the processor circuitry is configured to:

obtain a first model pool, the first model pool comprising at least one decision model for indicating a battle policy adopted by a virtual character in a battle;

input, in an $n^{th}$ iteration process, $i^{th}$ battle state data into an $n^{th}$ decision model to obtain an action instruction outputted by the $n^{th}$ decision model, the $i^{th}$ battle state data being for representing a battle state at an $i^{th}$ battle time in a battle process, and the action instruction being for instructing a first client to control a first virtual character to act and return $i+1^{th}$ battle state data collected by the first virtual character after acting, n and i being a positive integer;

train the $n^{th}$ decision model based on battle state data in the battle process to obtain an $n+1^{th}$ decision model, the battle state data comprising the $i+1^{th}$ battle state data; and add the $n+1^{th}$ decision model to the first model pool.

According to another aspect, this embodiment of this disclosure provides a non-transitory machine-readable media, having instructions stored on the machine-readable media. When being executed, the instructions are configured to cause a machine to:

obtain a first model pool, the first model pool comprising at least one decision model for indicating a battle policy adopted by a virtual character in a battle;

input, in an $n^{th}$ iteration process, $i^{th}$ battle state data into an $n^{th}$ decision model to obtain an action instruction outputted by the $n^{th}$ decision model, the $i^{th}$ battle state data being for representing a battle state at an $i^{th}$ battle time in a battle process, and the action instruction being for instructing a first client to control a first virtual character to act and return $i+1^{th}$ battle state data collected by the first virtual character after acting, n and i being a positive integer;

train the $n^{th}$ decision model based on battle state data in the battle process to obtain an $n+1^{th}$ decision model, the battle state data comprising the $i+1^{th}$ battle state data; and add the $n+1^{th}$ decision model to the first model pool.

In each round of iteration, $i^{th}$ battle state data is inputted into an $n^{th}$ decision model to obtain an action instruction outputted by the $n^{th}$ decision model. The action instruction is used for instructing a first client to control a first virtual character to act. After controlling the first virtual character to act, the first client returns collected $i+1^{th}$ battle state data, thereby learning and establishing a mapping relationship between a battle state and a battle action and training the $n^{th}$ decision model through the battle state data in a battle process to obtain an $n+1^{th}$ decision model. The decision models are trained through the battle state data in the battle process, the decision-making ability of the decision models is improved, and the decision models perform as well as real players, thereby enhancing the battle personification of the decision models.

DESCRIPTION OF EMBODIMENTS

At present, in game scenes such as novice tutorials and man-machine modes of fighting games, virtual characters controlled by players may battle against a game artificial intelligence, namely a game AI, with a certain policy and decision-making ability. In the related art, the behaviors of the game AI are controlled by a built-in behavior tree of a client, or battle data generated by players in a game process is used for imitation learning, and a mapping network from a battle state to an output action is trained to control the game AI to battle against virtual characters controlled by the players. However, in the related art, the behavior tree is fixed in structure, which makes the game AI single in game performance, lacks changes, and cannot approach the performance of real players. In addition, due to the poor reliability of battle data of the players, it is easy to produce an over-fitting problem in a training process, which leads to a big difference between the actual performance and the expected value of the game AI, thereby causing a poor personification effect of the game AI.

Figure 1:
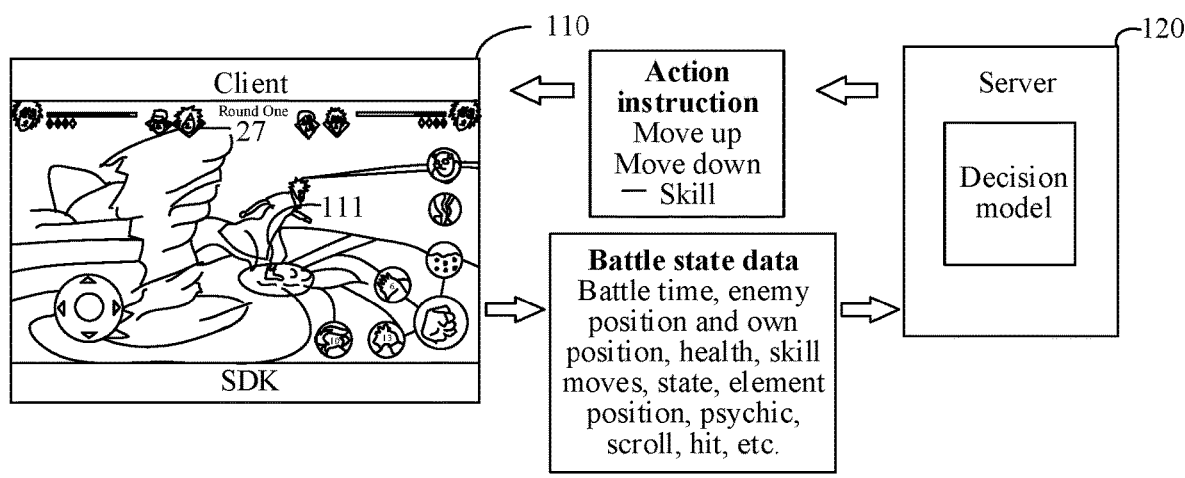
FIG. 1 shows a schematic diagram of a decision model training method according to an exemplary embodiment of this disclosure.

Therefore, in the embodiments of this disclosure, decision models are trained by a reinforcement learning method. Compared with the solution in the related art, the decision-making ability of the decision models is improved, and the decision models perform as well as real players, thereby enhancing the battle personification of the decision models. FIG. 1 shows a schematic diagram of a decision model training method according to an exemplary embodiment of this disclosure.

A game application is run in a client 110. When a game starts, the client 110 transmits a start request to a server. The server 120 returns corresponding battle configuration data according to requirements of the client 110. After obtaining the battle configuration data, the client constructs a battle and generates a game AI. The game AI is used for controlling virtual characters to battle.

The client 110 is provided with a software development kit (SDK). After the battle starts, the client 110 interacts with the server 120 through the SDK. The SDK constructs current battle state data and uploads the current battle state data to the server 120. A decision model of the server 120 outputs an action instruction based on the battle data. The SDK obtains the action instruction from the server 120. The client 110 controls a virtual character 111 to act according to the action instruction, collects next battle state data after the virtual character 111 acts, and returns the data to the SDK. The SDK then uploads the next battle state data to the server 120. The server 120 trains the decision model based on the current battle state data and the next battle state data. The decision model training method is introduced below.

Figure 2:
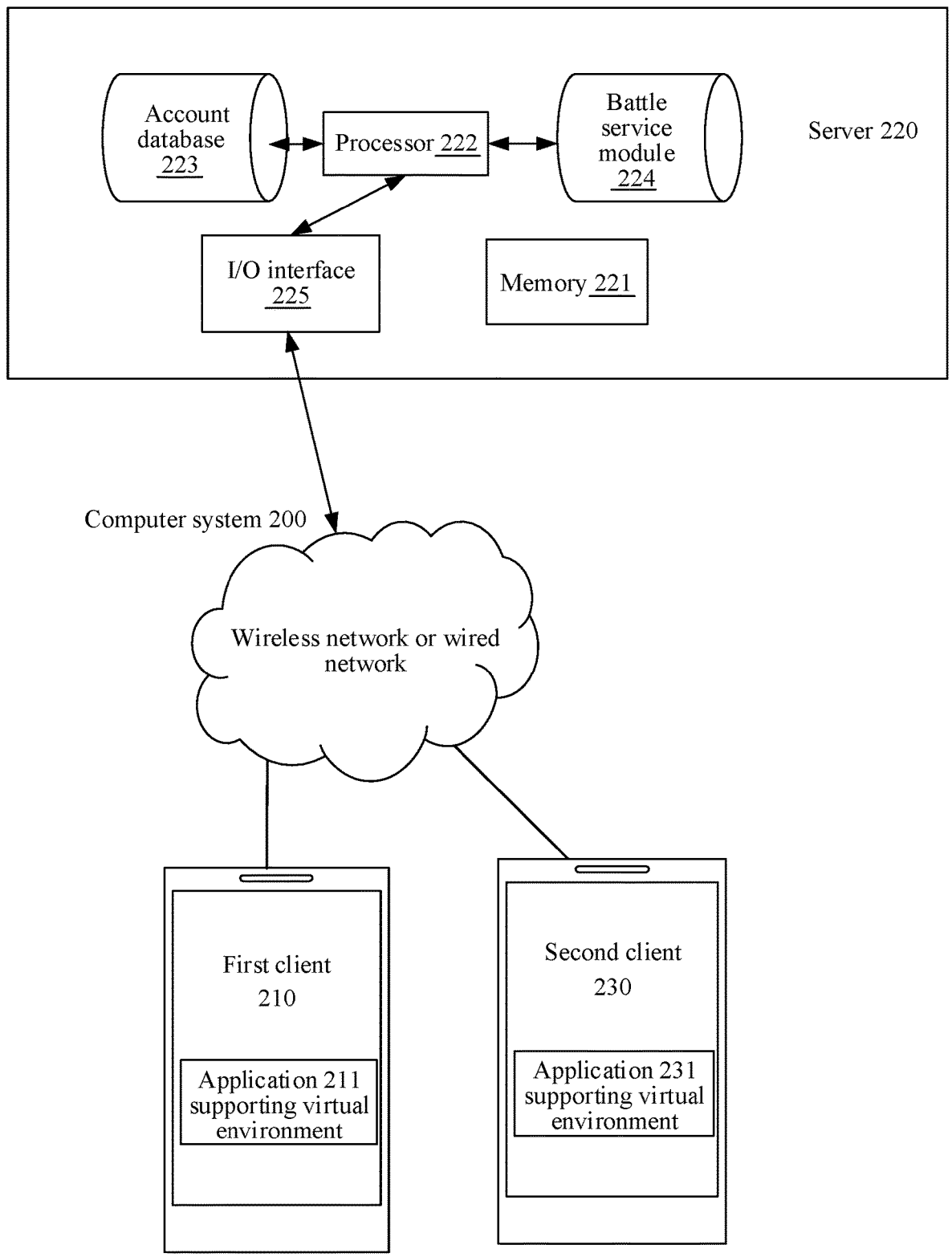
FIG. 2 shows a schematic diagram of an implementation environment according to an exemplary embodiment of this disclosure.

FIG. 2 shows a schematic diagram of an implementation environment according to an embodiment of this disclosure. The implementation environment may include: a first client 210, a server 220, and a second client 230.

An application 211 supporting a virtual environment is run in the first client 210, and the application 211 may be a multiplayer online battle program. When the application 211 is run in the first client 210, a user interface of the application 211 is displayed on a screen of the first client 210. The application 211 may be any one of a multiplayer online battle arena (MOBA) game, a shooting game, a simulation game (SLG), and a fighting game. In this embodiment, the application 211 is exemplified by being a fighting game. The first client 210 is provided with an SDK. The first client interacts with the server 220 through the SDK, including interaction processes such as constructing battle state data and uploading the data to the server 220, and obtaining an action instruction from the server 220. In this embodiment of this disclosure, the first client 210 controls a first virtual character. Exemplarily, the first virtual character may be a simulated character or an animated character. The fighting game application obtains the action instruction transmitted by the server 220 from the SDK. The first virtual character executes the corresponding action to simulate the effect of human control, except that the control here is not inputted through an external device (such as a touch screen or a rocker key), but is generated by a decision model.

An application 231 supporting a virtual environment is run in the second client 230, and the application 231 may be a multiplayer online battle program. When the application 231 is run in the second client 230, a user interface of the application 231 is displayed on a screen of the second client 230. The client may be any one of a MOBA game, a shooting game, a SLG, and a fighting game. In this embodiment, the application 231 is illustrated by being a fighting game. Similarly, the second client 230 is provided with an SDK. The second client interacts with the server 220 through the SDK, including constructing battle state data and uploading the data to the server 220, and obtaining an action instruction from the server 220. In this embodiment of this disclosure, the second client 230 controls a second virtual character. Exemplarily, the second virtual character may be a simulated character or an animated character. The fighting game application obtains the action instruction transmitted by the server 220 from the SDK. The second virtual character executes the corresponding action to simulate the effect of human control, except that the control here is not inputted through an external device (such as a touch screen or a rocker key), but is generated by a decision model.

In some implementations, the applications installed on the first client 210 and the second client 230 are the same, or the applications installed on the two clients are the same type of applications on different operating system platforms (Android or IOS). The first client 210 may generally refer to one of a plurality of clients, and the second client 230 may generally refer to another of the plurality of clients. This embodiment is exemplified only by the first client 210 and the second client 230. The first client 210 and the second client 230 have the same or different device types. The device types include: at least one of a smartphone, a tablet computer, an e-book reader, a moving picture experts group audio layer III (MP3) player, a moving picture experts group audio layer IV (MP4) player, a laptop computer, and a desktop computer.

Only two clients are shown in FIG. 2. However, in different embodiments, a plurality of other clients may have access to the server 220. The first client 210, the second client 230, and the other clients are connected to the server 220 through the wireless network or the wired network.

The server 220 includes at least one of a server, a server cluster composed of a plurality of servers, a cloud computing platform, and a virtualization center. In some implementations, the server 220 undertakes primary computing tasks, and the client undertakes secondary computing tasks. Or, the server 220 undertakes secondary computing tasks, and the client undertakes primary computing tasks. Or, the server 220 and the client perform cooperative computing using a distributed computing architecture.

In this embodiment of this disclosure, the server 220 includes a memory 221, a processor 222, an account database 223, a battle service module 224, and an input/output (I/O) interface 225. The processor 222 is configured to load an instruction stored in the server 220 and process data in the account database 223 and the battle service module 224. The account database 223 is configured to store data of accounts used by the first client 210, the second client 230, and the other clients, such as avatars of the accounts, nicknames of the accounts, levels of the accounts, and service regions where the accounts are located. The battle service module 224 is configured to provide a plurality of battle rooms for game AIs to battle, such as a 1V1 battle, a 3V3 battle, or a 5V5 battle. The I/O interface 225 is configured to communicate data with the first client 210 and/or the second client 230 through the wireless network or the wired network.

In a possible implementation, in this embodiment of this disclosure, the server 220 constructs a first model pool and a second model pool. The first model pool at least includes a decision model, and the second model pool at least includes a decision model trained in a historical iteration process. In an $n^{th}$ round of iterative training process, the server samples an opponent decision model from the second model pool, battles against an $n^{th}$ decision model, trains an $n+1^{th}$ decision model based on battle state data, and adds the $n+1^{th}$ decision model to the first model pool and the second model pool respectively for a next round of iterative training.

In addition, in this embodiment of this disclosure, a training method is illustrated by being applied to a server in FIG. 2. In a possible implementation, the method may also be applied to a computer device such as a personal computer or a workstation. The following embodiment schematically describes an example in which a decision model training method is applied to a computer device, but is not limited thereto.

Figure 3:
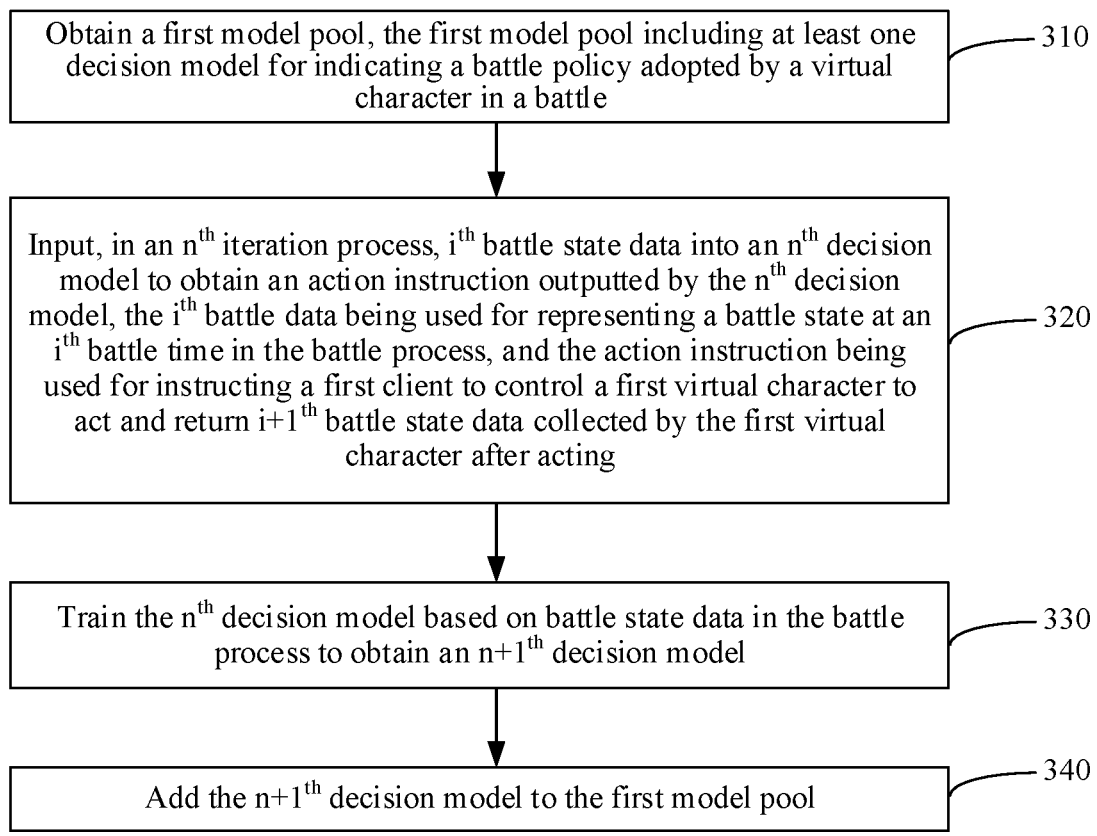
FIG. 3 shows a flowchart of a decision model training method according to an exemplary embodiment of this disclosure.

FIG. 3 shows a flowchart of a decision model training method according to an exemplary embodiment of this disclosure. The method includes the following steps:

Step 310: Obtain a first model pool, the first model pool including at least one decision model for indicating a battle policy adopted by a virtual character in a battle.

In a fighting game, two opposing sides are battling. In a possible implementation, a first client controls a first virtual character to battle against an opposing virtual character. A computer device is provided with a first model pool. A decision model in the first model pool is configured to output a battle policy, whereby the first client controls the first virtual character to act according to the battle policy, and then to battle against the opposing virtual character.

In some implementations, the battle policy may be related to movement directions of virtual characters, for example, upward movement, downward movement, leftward movement, and rightward movement. This embodiment of this disclosure is not limited thereto.

In some implementations, the battle policy may also be related to skill output of virtual characters, for example, selecting body doubles, summoning psychics, and battling using scrolls. This embodiment of this disclosure is not limited thereto.

In addition, in this embodiment of this disclosure, the first model pool includes at least one decision model, and also includes a behavior tree built in the client for battling against an initial decision model.

Step 320: Input, in an $n^{th}$ iteration process, $i^{th}$ battle state data into an $n^{th}$ decision model to obtain an action instruction outputted by the $n^{th}$ decision model, the $i^{th}$ battle data being used for representing a battle state at an $i^{th}$ battle time in the battle process, and the action instruction being used for instructing a first client to control a first virtual character to act and returning $i+1^{th}$ battle state data collected by the first virtual character after acting.

The battle state data is used for representing a battle state at a battle time. Each battle time corresponds to one battle state. Exemplarily, the battle state data includes all game information in a battle picture of the first virtual character and the opposing virtual character.

In some implementations, the battle state data includes at least one of orientation data, attribute data, and skill data of virtual characters. The orientation data of virtual characters includes positions and orientations of the first virtual character and the opposing virtual character. The attribute data includes the health, ninja points, and skill levels of the first virtual character and the opposing virtual character. The skill data includes available skills, states of cooling of skills, types of skills, and moves of skills, such as psychics, scrolls, hits, and states of body doubles. The battle state data may also include duration of a game battle, and the like. This embodiment of this disclosure is not limited thereto.

In a possible implementation, the computer device may obtain $i^{th}$ battle state data at an $i^{th}$ battle time from the first client, and input the $i^{th}$ battle state data into an $n^{th}$ decision model. The $n^{th}$ decision model may output a battle policy corresponding to the battle state according to the $i^{th}$ battle state data, that is, output an action instruction, whereby the first client may control the first virtual character to act according to the action instruction and enter a next battle state.

The action instruction includes a movement instruction and a skill use instruction. The movement instruction may be moving up and down or moving left and right. The skill use may be using skills, body doubles and psychics, and the like. The action instructions outputted by the decision models correspond to the actions executed by the first virtual character under the control of the first client one by one. As the action instructions are different, the first client controls the first virtual character to execute different actions.

In a possible implementation, it is avoided that the computer device interacts with the client too frequently to cause the trained decision model to behave too aggressively. Therefore, the client periodically returns the battle state data to the $n^{th}$ decision model. That is to say, an $i^{th}$ battle time and an $i+1^{th}$ battle time are separated by a certain time.

In some implementations, the interval time may be 100 ms, 200 ms, or the like. This embodiment of this disclosure is not limited thereto. Moreover, the interval time may be determined according to the interval time of the action when the player actually controls the virtual character to battle, thereby improving the personification of the decision model.

Figure 4:
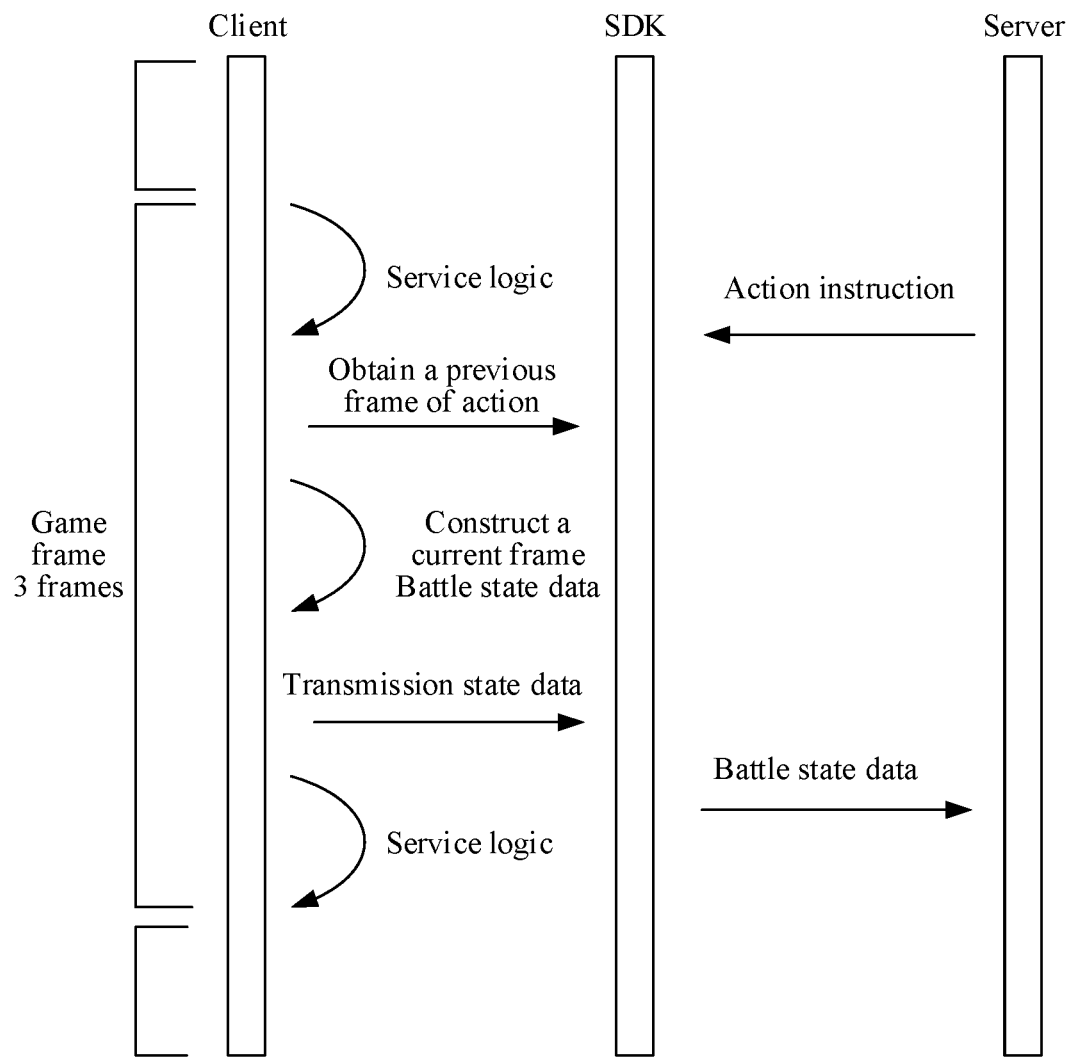
FIG. 4 shows a schematic diagram of interaction between a client and a server in a game battle according to an exemplary embodiment of this disclosure.

Exemplarily, as shown in FIG. 4, the client interacts with the server every three game frames (namely, 100 ms). An SDK of the client uploads battle state data corresponding to the first to third game frames, that is, uploads first battle state data to the server. The server inputs the battle state data into the $n^{th}$ decision model to obtain an action instruction, and returns the action instruction to the SDK. Based on the action instruction, the client controls the virtual character to act. The SDK collects, based on the action executed by the virtual character, battle state data corresponding to the fourth to sixth game frames, namely second battle state data, and uploads the data to the server.

Exemplarily, in the second iteration process, the computer device inputs the first battle state data into a second decision model to obtain an action instruction outputted by the second decision model. The second decision model is a model trained in the first iteration process. The computer device transmits the action instruction outputted by the second decision model to the first client. The first client controls the first virtual character to act based on the action instruction outputted by the second decision model. The client also returns the collected second battle state data after the first virtual character acts to the computer device for training a next decision model by the computer device.

Step 330: Train the $n^{th}$ decision model based on battle state data in the battle process to obtain an $n+1^{th}$ decision model.

In a possible implementation, the computer device may train the $n^{th}$ decision model using a change value of battle state data between adjacent battle times in the battle process. That is, a change value of battle state data is obtained based on the $i^{th}$ battle state data and the $i+1^{th}$ battle state data, and the $n^{th}$ decision model is trained based on the change value of the battle state data to obtain an $n+1^{th}$ decision model.

Exemplarily, the computer device obtains a change value of battle state data based on the first battle state data and the second battle state data, and trains the second decision model based on the change value of the battle state data to obtain a third decision model.

Step 340: Add the $n+1^{th}$ decision model to the first model pool.

In this embodiment of this disclosure, the computer device adds a decision model trained in each iteration process to the first model pool for subsequently training the decision model.

Exemplarily, the computer device adds the third decision model to the first model pool.

To sum up, in this embodiment of this disclosure, in each round of iteration, $i^{th}$ battle state data is inputted into an $n^{th}$ decision model to obtain an action instruction outputted by the $n^{th}$ decision model. The action instruction is used for instructing a first client to control a first virtual character to act. After controlling the first virtual character to act, the first client returns collected $i+1^{th}$ battle state data, thereby learning and establishing a mapping relationship between a battle state and a battle action and training the $n^{th}$ decision model through the battle state data in a battle process to obtain an $n+1^{th}$ decision model. The decision models are trained through the battle state data in the battle process, the decision-making ability of the decision models is improved, and the decision models perform as well as real players, thereby enhancing the battle personification of the decision models.

Figure 5:
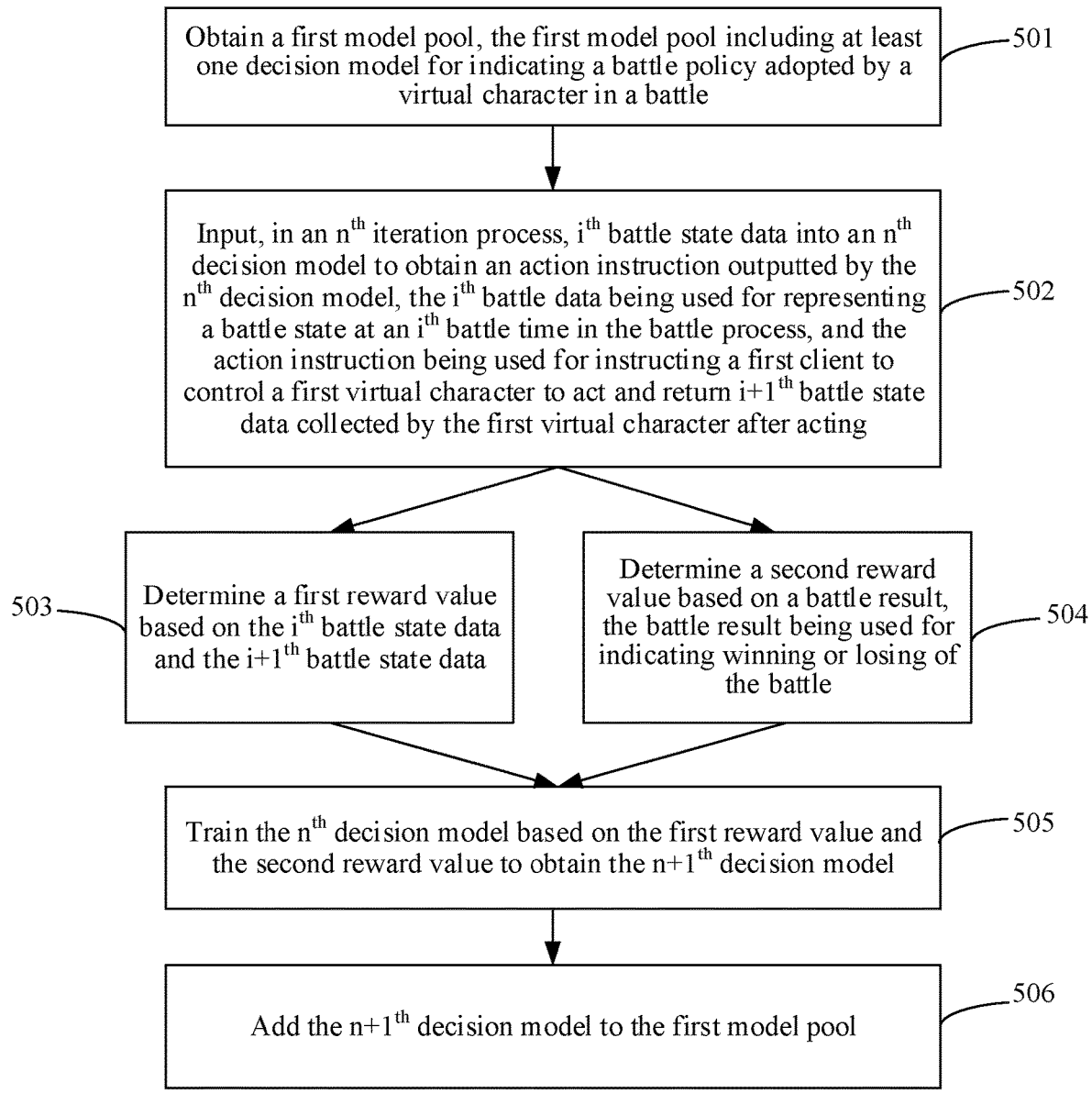
FIG. 5 shows a flowchart of a decision model training method according to another exemplary embodiment of this disclosure.

In order to enhance the battle personification of a decision model and make a battle policy used by a virtual character indicated by the decision model closer to a battle policy used by a virtual character controlled by a real player in a battle, in a possible implementation, the idea of reinforcement learning is introduced. For an action instruction outputted by the decision model, it is necessary to determine a first reward value according to battle state data corresponding to adjacent battle times, determine a second reward value based on a battle result, and train the decision model based on the first reward value and the second reward value. FIG. 5 shows a flowchart of a decision model training method according to another exemplary embodiment of this disclosure.

Step 501: Obtain a first model pool, the first model pool including at least one decision model for indicating a battle policy adopted by a virtual character in a battle.

An implementation of this step is similar to that of step 310.

Step 502: Input, in an $n^{th}$ iteration process, $i^{th}$ battle state data into an $n^{th}$ decision model to obtain an action instruction outputted by the $n^{th}$ decision model, the $i^{th}$ battle state data being used for representing a battle state at an $i^{th}$ battle time in the battle process, and the action instruction being used for instructing a first client to control a first virtual character to act and returning $i+1^{th}$ battle state data collected by the first virtual character after acting.

An implementation of this step is similar to that of step 320.

Step 503: Determine a first reward value based on the $i^{th}$ battle state data and the $i+1^{th}$ battle state data.

In a possible implementation, the computer device may determine a first reward value using change of battle state data between adjacent battle times. That is, the first reward value is determined using a difference between the $i^{th}$ battle state data and the $i+1^{th}$ battle state data. This mode may include the following step 503a to step 503b (not shown in the figure):

Step 503a: Obtain an $i^{th}$ character attribute value in the $i^{th}$ battle state data and an $i+1^{th}$ character attribute value in the $i+1^{th}$ battle state data, the character attribute values including attribute values of the first virtual character and a second virtual character, and the second virtual character being a virtual character battling against the first virtual character.

The character attribute values refer to the attribute values of the first virtual character and the second virtual character in the battle state data that affect the game result.

In some implementations, the character attribute values may be the health, blue bars and the like of the first virtual character and the second virtual character. This embodiment of this disclosure is not limited thereto.

When obtaining the character attribute values, both the attribute value of the first virtual character controlled by the first client and the attribute value of the second virtual character as an opponent need to be obtained, so as to analyze the change situations of the attribute values of the virtual characters in the battle process.

Step 503b: Determine the first reward value based on an attribute value change situation between the $i^{th}$ character attribute value and the $i+1^{th}$ character attribute value.

In a possible implementation, the first reward value may be calculated by the following formula:

First reward value=[($i+1^{th}$ character attribute value of first virtual character)−($i^{th}$ character attribute value of first virtual character)+($i+1^{th}$ character attribute value of second virtual character)−($i^{th}$ character attribute value of second virtual character)]×first reward coefficient.

Exemplarily, the character attribute values are the health of the first virtual character and the second virtual character. In the first battle state data, the health of the first virtual character is 100, and the health of the second virtual character is 80. In the second battle state data, the health of the first virtual character is 150, and the health of the second virtual character is 70. The health change of the first virtual character is 50, and the health change of the second virtual character is −10. If the first reward coefficient is 20, the first reward value is 800.

Step 504: Determine a second reward value based on a battle result, the battle result being used for indicating winning or losing of the battle.

In a possible implementation, the computer device determines a second reward value based on a winning rate of the first virtual character. If the winning rate is lower than 50%, the second reward value is negative. If the winning rate is higher than 50%, the second reward value is positive. The second reward value may be calculated by the following formula:

Second reward value=winning rate of first virtual character×second reward coefficient.

Exemplarily, in the first iteration process, the first virtual character and the second virtual character compete for 100 rounds, the winning rate of the first virtual character is 30%, the second reward coefficient is 30, and the second reward value is −900.

Step 505: Train the $n^{th}$ decision model based on the first reward value and the second reward value to obtain the $n+1^{th}$ decision model.

In a possible implementation, the computer device sets different weight coefficients for the first reward value and the second reward value, respectively, and calculates a total reward value based on the first reward value, the second reward value, and the respective weight coefficients. The computer device trains the $n^{th}$ decision model based on the total reward value to obtain the $n+1^{th}$ decision model.

In addition, in order to train the decision model with victory orientation, the weight of the first reward value is less than the weight of the second reward value.

Step 506: Add the $n+1^{th}$ decision model to the first model pool.

An implementation of this step is similar to that of step 340.

In this embodiment of this disclosure, the idea of reinforcement learning is introduced. A first reward value is determined based on a character attribute value in battle state data corresponding to adjacent battle times, and a second reward value is determined based on a battle result, whereby the computer device trains a decision model based on the first reward value and the second reward value, and enhances the battle personification of the decision model.

Usually, when players control virtual characters to battle, there is usually a certain policy for the timing of movement and the use of skills, so as to use skills reasonably and control the movement of the virtual characters. In a possible implementation, in order to improve the personification of the decision model, reward values corresponding to movement or skill-related policies may also be set for the training process of the decision model. As shown in Table 1, the reward value of the decision model trained by the computer device is further optimized from two aspects of basic reward value and auxiliary reward value, so as to further improve the battle personification of the decision model.

TABLE 1

| Main category of reward value | Sub-category of reward value | Reward and punishment dimensions |
|---|---|---|
| Basic reward value | Battle core | Change of character attribute value |
|  |  | Battle result |
| Auxiliary reward value | Body double personification | Body double use |
|  |  | Body double counterattack |
|  |  | Remaining amount of body double |
|  |  | Invincible utilization of body double |
|  | Skill personification | Rational use of psychics |
|  |  | Rational use of scrolls |
|  |  | Distribution of skill diversity |
|  |  | Rational use of ultimate skills |
|  | Movement personification | Move at start |
|  |  | Advantageously avoid fighting |

Figure 6:
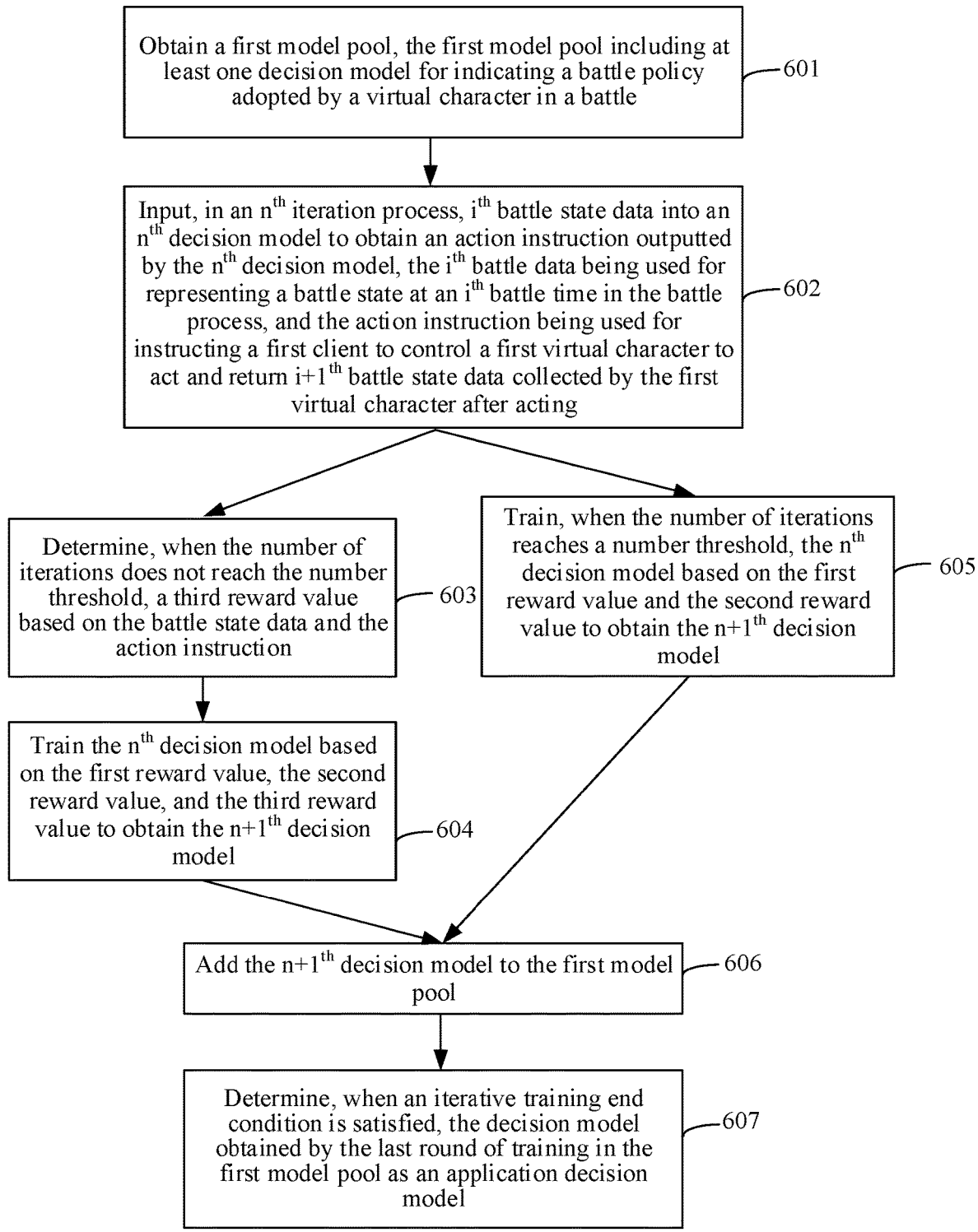
FIG. 6 shows a flowchart of a decision model training method according to another exemplary embodiment of this disclosure.

The decision model training method in this embodiment of this disclosure is described below in connection with the reward dimension shown in Table 1. FIG. 6 shows a flowchart of a decision model training method according to another exemplary embodiment of this disclosure.

Step 601: Obtain a first model pool, the first model pool including at least one decision model for indicating a battle policy adopted by a virtual character in a battle.

An implementation of this step is similar to that of step 310.

Step 602: Input, in an $n^{th}$ iteration process, $i^{th}$ battle state data into an $n^{th}$ decision model to obtain an action instruction outputted by the $n^{th}$ decision model, the $i^{th}$ battle state data being used for representing a battle state at an $i^{th}$ battle time in the battle process, and the action instruction being used for instructing a first client to control a first virtual character to act and returning $i+1^{th}$ battle state data collected by the first virtual character after acting.

An implementation of this step is similar to that of step 320, and is not described again in this embodiment of this disclosure.

Step 603: Determine, when the number of iterations does not reach the number threshold, a third reward value based on the battle state data and the action instruction.

The third reward value is a reward value set for the acting rationality of the first virtual character in the battle process, so as to improve the personification of the decision model. In a possible implementation, the acting rationality of the first virtual character may be judged according to the current battle state and the action instruction outputted by the decision model. Thereafter, the computer device may determine the third reward value according to the acting rationality. This mode may include step 603a to step 603b (not shown in the figure):

Step 603a: Determine, when the number of iterations does not reach the number threshold, a rationality parameter based on the battle state data and the action instruction, the rationality parameter being used for representing the rationality of the virtual character executing an action represented by the action instruction under the battle state represented by the battle state data.

In this embodiment of this disclosure, in order to guide the decision model to learn personified basic rules and playing methods in the low-round iteration process, a rationality parameter is introduced as a personified evaluation standard when the number of iterations does not reach the number threshold. However, when the number of iterations reaches the number threshold, the training strength of the decision model is emphasized. Therefore, the rationality parameter is not used to train the decision model.

In a possible implementation, the computer device presets criteria for judging whether different action instructions are rational or not, and determines a rationality parameter interval according to the criteria. The computer device selects a rationality parameter from the rationality parameter interval according to the battle state data and the action instruction.

In some implementations, there are different criteria for judging whether different action instructions are rational or not. As shown in Table 2, according to different types of action instructions, the criteria for the rationality thereof are also different.

TABLE 2

| Type of Action Instruction | Criteria for Judging Rationality |
| --- | --- |
| Body double use | Do not use a body double or use the body double at the right time |
| Body double counterattack | After catching flaws of the enemy, a body double performs damage output and stun control |
| Remaining amount of body double | There are more than one body double and up to four body doubles |
| Invincible utilization of body double | A body double has an invincible time of 1.5 seconds, causes damage, controls the enemy, and escapes from a danger zone within the invincible time |
| Rational use of psychics/scrolls | An opponent is stunned or does not act to attack/cast psychics/scrolls |
| Rational use of ultimate skills | Ultimate skills are used to kill an opponent and a body double of the opponent is being cooled |
| Skill diversity | Use more than one skill for battling |
| Move at start | Move at the start of the game |
| Advantageously avoid fighting | Obtain a health advantage and then stop moving |

Step 603b: Determine the third reward value based on the rationality parameter, the third reward value being positively correlated with the rationality parameter.

In a possible implementation, the computer device selects a rationality parameter from a rationality parameter interval based on the battle state data and the action instruction, and determines a third reward value based on the rationality parameter. As the rationality parameter is larger, the third reward value is larger.

Exemplarily, the rationality parameter interval ranges from 0 to 100. 100 is used for representing a rational action and 0 is used for representing a non-rational action. Therefore, as the rationality parameter is closer to 100, the third reward value is larger.

In a possible implementation, the third reward value may be calculated by the following formula:

Third reward value=rationality parameter×parameter coefficient.

Exemplarily, if the rationality parameter determined by the computer device is 40 and the parameter coefficient is 10, the third reward value is 400.

The parameter coefficient is used for indicating the corresponding weight of the rationality parameter. Further, the rationality parameters for different action instructions may also correspond to different parameter coefficients. For example, the parameter coefficients for the rationality parameters for skill use may be larger than the parameter coefficients for the rationality parameters for moving actions.

Step 604: Train the $n^{th}$ decision model based on the first reward value, the second reward value, and the third reward value to obtain the $n+1^{th}$ decision model.

The first reward value and the second reward value are used for training the strength of the decision model, while the third reward value is mainly used for training the personification of the decision model. In a possible implementation, different weights may be set for different reward values based on different training policies. The first reward value and the second reward value correspond to a basic reward weight, and the third reward value corresponds to an auxiliary reward weight. In the training process, if the strength of the decision model needs to be improved, the basic reward weight may be adjusted, while if the personification of the decision model needs to be strengthened, the auxiliary reward weight may be adjusted to balance the strength of the decision model and the personification of the decision model. The operation of training the $n^{th}$ decision model based on the first reward value, the second reward value, and the third reward value may include step 604a to step 604c (not shown in the figure):

Step 604a: Determine a basic reward value based on the first reward value, the second reward value, and a basic reward weight.

The mode of calculating the first reward value and the second reward value may be similar to step 503 to step 504 in the foregoing embodiment.

In a possible implementation, the basic reward value may be calculated by the following formula:

Basic reward value=(first reward value+second reward value)×basic reward weight.

Exemplarily, if the first reward value is 200, the second reward value is 100, and the basic reward weight is 3, then the basic reward value is 900.

In addition, in the iteration process, the basic reward weight is not fixed, but adjusted and changed according to the action instruction outputted by the decision model and the battle state data in the training process, so as to adjust the model strength of the decision model.

For example, in the iteration process, if the winning rate of the first virtual character is low according to the battle result in the battle state data, the basic reward weight will be increased to achieve the victory-oriented training purpose.

Step 604b: Determine an auxiliary reward value based on the third reward value and an auxiliary reward weight, the auxiliary reward weight being smaller than the basic reward weight, and the auxiliary reward weight being negatively correlated with the number of iterations.

In a possible implementation, the auxiliary reward value may be calculated by the following formula:

Auxiliary reward value=third reward value×auxiliary reward weight.

Exemplarily, if the third reward value is 300 and the auxiliary reward weight is 2, then the auxiliary reward value is 600.

In addition, in the iteration process, in order to guide the decision model to learn personified basic rules in the low-round process, more emphasis is placed on improving the strength of the decision model in a high round. In the training process, the auxiliary reward weight may be adjusted according to the number of iterations. The auxiliary reward weight is reduced with the increase of the number of iterations. At the end of each round of training, the auxiliary reward weight is attenuated. When the number of iterations reaches the number threshold, the auxiliary reward weight is reduced to 0.

In this embodiment, only the implementations of step 604a and step 604b are illustrated but the execution timing is not limited. The two steps may be performed synchronously or successively.

Step 604c: Train the $n^{th}$ decision model based on the basic reward value and the auxiliary reward value to obtain the $n+1^{th}$ decision model.

In a possible implementation, when the number of iterations does not reach the number threshold, the computer device trains the $n^{th}$ decision model based on the basic reward value and the auxiliary reward value to obtain the $n+1^{th}$ decision model, in order to guide the decision model to learn personified basic rules and playing methods, whereby the decision model performs as well as real players.

Step 605: Train, when the number of iterations reaches a number threshold, the $n^{th}$ decision model based on the first reward value and the second reward value to obtain the $n+1^{th}$ decision model.

In this embodiment of this disclosure, in order to guide the decision model to improve the strength in the high-round iteration process, the decision model is trained based on the first reward value and the second reward value when the number of iterations reaches the number threshold, instead of adopting the third reward value.

Exemplarily, when the number of iterations reaches 1000, the computer device trains the second decision model based on the first reward value and the second reward value to obtain the third decision model.

Step 606: Add the $n+1^{th}$ decision model to the first model pool.

An implementation of this step is similar to that of step 340.

Step 607: Determine, when an iterative training end condition is satisfied, the decision model obtained by the last round of training in the first model pool as an application decision model.

In a possible implementation, when a difference between the winning rate of the decision model obtained by the last round of training in the first model pool and the winning rate of the decision model obtained by the previous round of training is lower than a training threshold, it indicates that the performance of the decision model tends to be stable, and the performance improvement of the decision model is small after continuous training. At this moment, an iterative training end condition is met, and the decision model obtained by the last round of training is determined as an application decision model.

Exemplarily, Table 3 shows a winning rate of a decision model obtained by each round of training in the first model pool according to an exemplary embodiment of this disclosure.

TABLE 3

|  | Behavior tree 1 | Behavior tree 2 | First decision model | Second decision model | Third decision model | Fourth decision model | Fifth decision model | Sixth decision model |
| --- | --- | --- | --- | --- | --- | --- | --- | --- |
| Behavior tree 1 | — | — | — | — | — | — | — | — |
| Behavior tree 2 | — | — | — | — | — | — | — | — |
| First decision model | 92.5% | 93.43% | — | — | — | — | — | — |
| Second decision model | — | — | 96.51% | — | — | — | — | — |
| Third decision model | — | — | 95.87% | 90.06% | — | — | — | — |
| Fourth decision model | — | — | 95% | 86.1% | 68.74% | — | — | — |
| Fifth decision model | — | — | 94.3% | 86.2% | 66.3% | 57.73% | — | — |
| Sixth decision model | — | — | 93.77% | 80.18% | 64.25% | 59.68% | 56.19% | — |

In Table 3, the percentage is used for representing the winning rate of "column model" against "row model", where "column model" is the decision model in the first model pool, and "row model" is the opponent decision model in the second model pool. It can be seen from Table 2 that with the increase of the number of iterations, the winning rate of the decision model trained in the first model pool gradually tends to be stable. That is, the winning rate of the sixth decision model is basically unchanged compared with that of the fifth decision model, and therefore the sixth decision model may be used as the disclosure decision model.

In this embodiment of this disclosure, when the number of iterations does not reach the number threshold, the decision model is trained based on the basic reward value and the auxiliary reward value, whereby the decision model learns personified basic rules and playing methods in the low-round iteration process, thereby enhancing the battle personification of the decision model. When the number of iterations reaches the number threshold, the decision model is trained only through the first reward value and the second reward value, thereby improving the strength of the decision model, and further making the disclosure decision model obtained by final training perform as well as real players.

Figure 7:
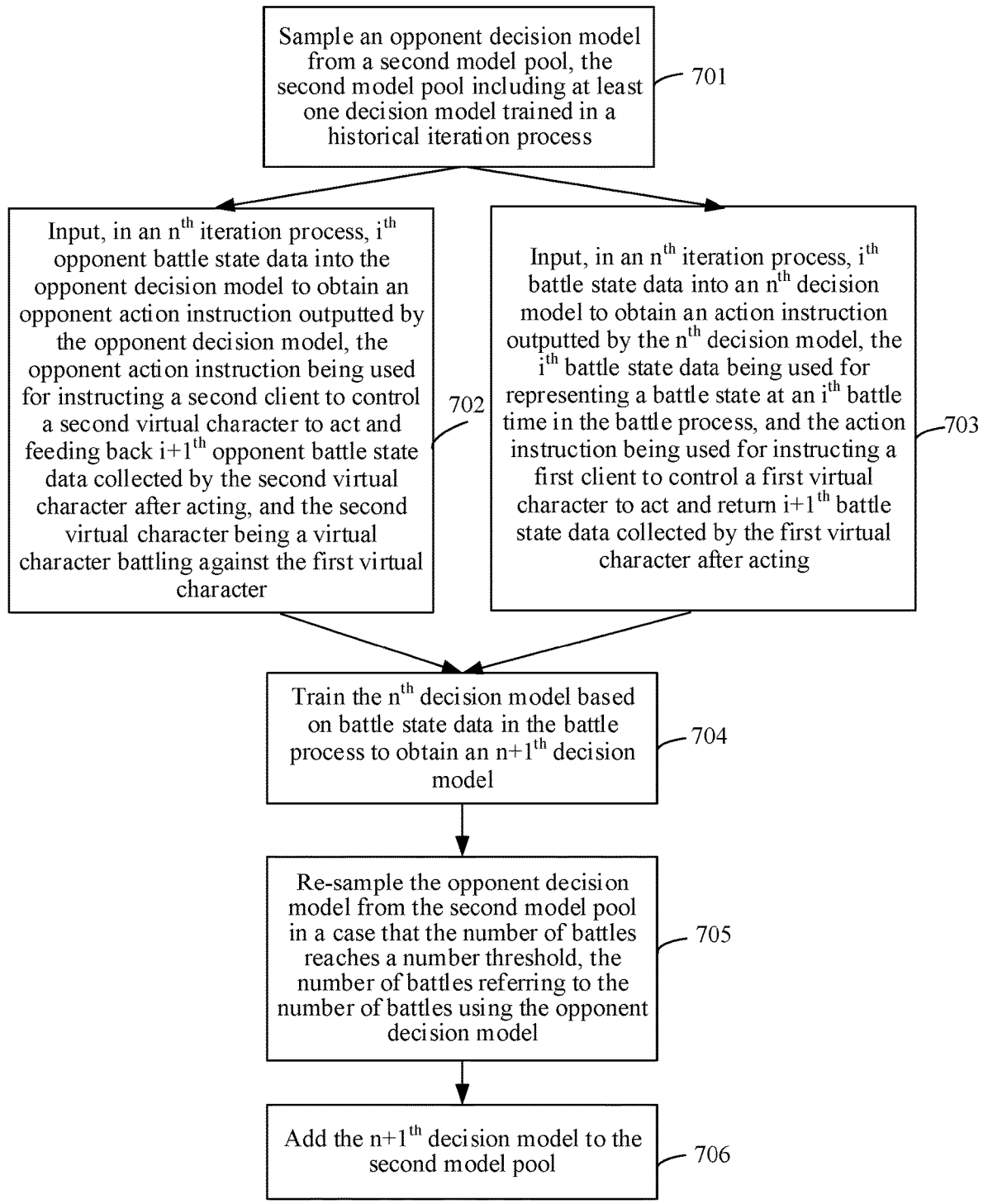
FIG. 7 shows a flowchart of a decision model training method according to another exemplary embodiment of this disclosure.

In a possible implementation, the computer device may use the decision model obtained by historical training as an opponent decision model to output an instruction to the second client, whereby the second client controls the second virtual character to battle against the first virtual character, thereby training the decision model. FIG. 7 shows a flowchart of a decision model training method according to an exemplary embodiment of this disclosure.

Step 701: Sample an opponent decision model from a second model pool, the second model pool including at least one decision model trained in a historical iteration process.

The second model pool includes a decision model obtained in a historical training process, whereby the computer device may sample from the second model pool to obtain an opponent decision model.

The first model pool and the second model pool may be arranged in the same computer device or in different computer devices, for example, in different servers. The decision model in the first model pool is configured to instruct the first client to control the first virtual character to act, and the opponent decision model in the second model pool is configured to instruct the second client to control the second virtual character to act. And the second virtual character is a virtual character that battles against the first virtual character, that is, the foregoing opposing virtual character.

In a possible implementation, the opponent decision model is sampled from the second model pool based on a historical winning rate corresponding to each decision model in the second model pool, where a sampling rate of the decision model is positively correlated with the historical winning rate.

The computer device samples the opponent decision model according to the historical winning rate of the decision model. As the historical winning rate of the decision model is higher, the sampling rate of the model is higher, that is, the probability of being sampled by the computer device as the opponent decision model is higher. Training through the opponent decision model with high winning rate is beneficial to improve the strength of the decision model, thereby performing as well as real players.

In addition, in the first iteration process, since there is no historical decision model, the behavior tree built in the client is used as an opponent for model training, the first decision model is then obtained, and the trained first decision model is added to the second model pool. Since the first decision model trained in the first iteration process already exists in the second model pool, the behavior tree built in the client is no longer used as an opponent for model training in the subsequent decision model training process.

And in a possible implementation, the historical winning rate of the opponent decision model is updated based on a battle result of the first virtual character and the second virtual character.

In order to ensure the accuracy of model training, the computer device updates the historical winning rate of the opponent decision model in the second model pool according to the battle result of the first virtual character and the second virtual character, thereby updating the sampling rate of each opponent decision model.

When the battle result of the first virtual character and the second virtual character is that the second virtual character wins, the historical winning rate of the opponent decision model is improved.

When the battle result of the first virtual character and the second virtual character is that the first virtual character wins, the historical winning rate of the opponent decision model is reduced.

Step 702: Input, in an $n^{th}$ iteration process, $i^{th}$ opponent battle state data into the opponent decision model to obtain an opponent action instruction outputted by the opponent decision model, the opponent action instruction being used for instructing a second client to control a second virtual character to act and returning $i+1^{th}$ opponent battle state data collected by the second virtual character after acting, and the second virtual character being a virtual character battling against the first virtual character.

Exemplarily, in the second iteration process, the computer device inputs first opponent battle state data into the opponent decision model to obtain an opponent action instruction outputted by the opponent decision model. The second virtual character controlled by the second client acts according to the opponent action instruction and battles against the first virtual character controlled by the first client. Also, the second client returns second opponent battle state data collected after the second virtual character acts to the computer device.

Step 703: Input, in an $n^{th}$ iteration process, $i^{th}$ battle state data into an $n^{th}$ decision model to obtain an action instruction outputted by the $n^{th}$ decision model, the $i^{th}$ battle state data being used for representing a battle state at an $i^{th}$ battle time in the battle process, and the action instruction being used for instructing a first client to control a first virtual character to act and returning $i+1^{th}$ battle state data collected by the first virtual character after acting.

Step 704: Train the $n^{th}$ decision model based on battle state data in the battle process to obtain an $n+1^{th}$ decision model.

The implementations of step 703 and step 704 are similar to the foregoing embodiment.

Step 705: Re-sample the opponent decision model from the second model pool when the number of battles reaches a number threshold, the number of battles referring to the number of battles using the opponent decision model.

In order to ensure the comprehensiveness of decision model training, when the number of battles between the opponent decision model in the second model pool and the decision model in the first model pool reaches a number threshold, the computer device re-samples the opponent decision model from the second model pool to avoid continuously using the same opponent decision model to battle.

Exemplarily, when the opponent decision model in the second model pool battles against the decision model in the first model pool for 100 times, the computer device re-samples the opponent decision model from the second model pool and re-battles against the decision model in the first model pool.

Step 706: Add the $n+1^{th}$ decision model to the second model pool.

The computer device adds a decision model trained in each iteration process to the second model pool.

Exemplarily, the computer device adds the third decision model obtained in the foregoing second iteration process to the second model pool.

Figure 8:
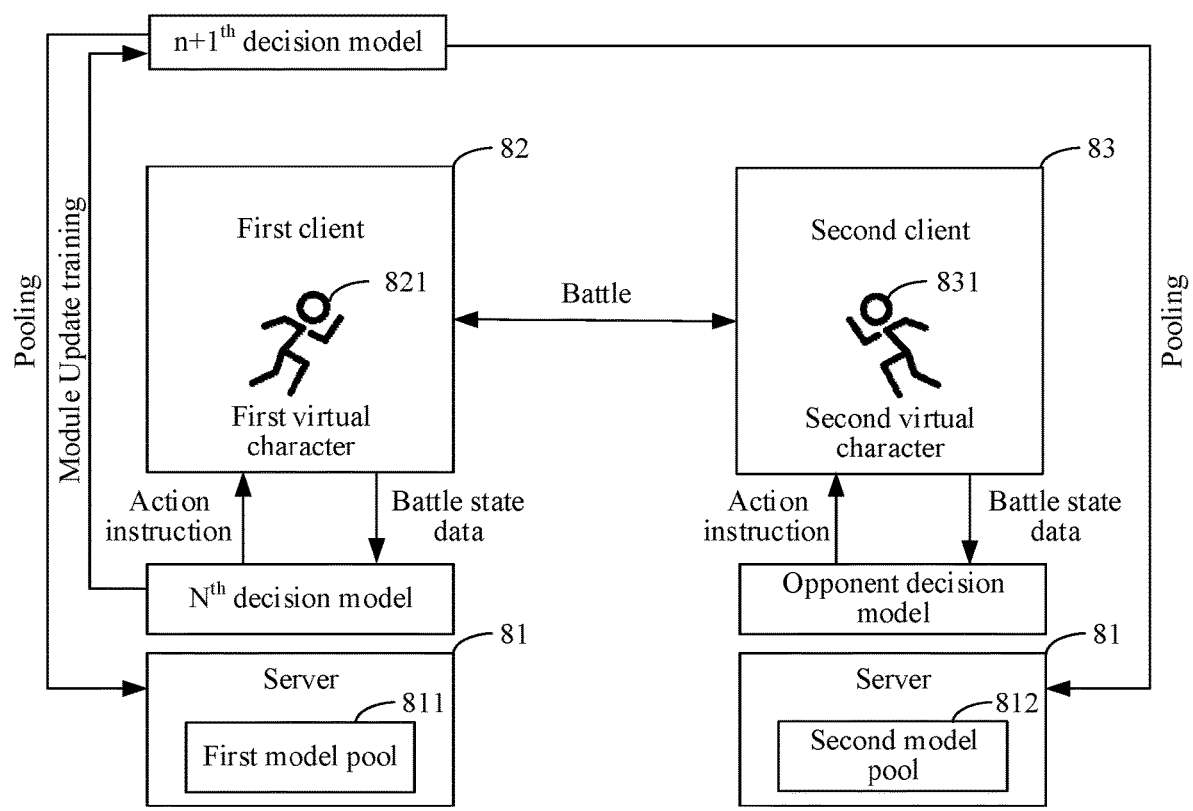
FIG. 8 shows a schematic process diagram of a decision model training method according to an exemplary embodiment of this disclosure.

For example, taking the second iteration process as an example, the decision model training method is introduced in combination with FIG. 8. A first model pool 811 and a second model pool 812 are provided in a computer device 81. The first model pool 811 at least includes a decision model, and the second model pool 812 at least includes a decision model trained in a historical iteration process. The computer device 81 selects an opponent decision model from the second model pool 812 as an opponent of a second decision model.

In the second iteration process, the computer device 81 inputs first battle state data into the second decision model to obtain an action instruction outputted by the second decision model. A first client 82 controls a first virtual character 821 to act based on the action instruction, and battles against a second virtual character 831 controlled by a second client 83. Also, second battle state data after the first virtual character 821 acts is collected and fed back to the computer device 81. Also, the computer device inputs the first battle state data into the opponent decision model to obtain an action instruction outputted by the opponent decision model. The second client 83 controls the second virtual character 831 to act based on the action instruction, and battles against the first virtual character 821 controlled by the first client 82. Also, a second battle state after the second virtual character 831 acts is collected and fed back to the computer device 81. The computer device 81 trains the second decision model based on the first battle state data and the second battle state data fed back by the first client 82 and the second client 83, obtains a third decision model, and adds the third decision model to the first model pool 811 and the second model pool 812, respectively. In this embodiment, the decision model obtained by historical training is used as the opponent decision model to battle, and a model reuse mode is adopted to improve the training efficiency of the decision model. And the computer device samples the opponent decision model from the second model pool based on a historical winning rate of the decision model, which is beneficial to improve the strength of the decision model in the training process.

Figure 9:
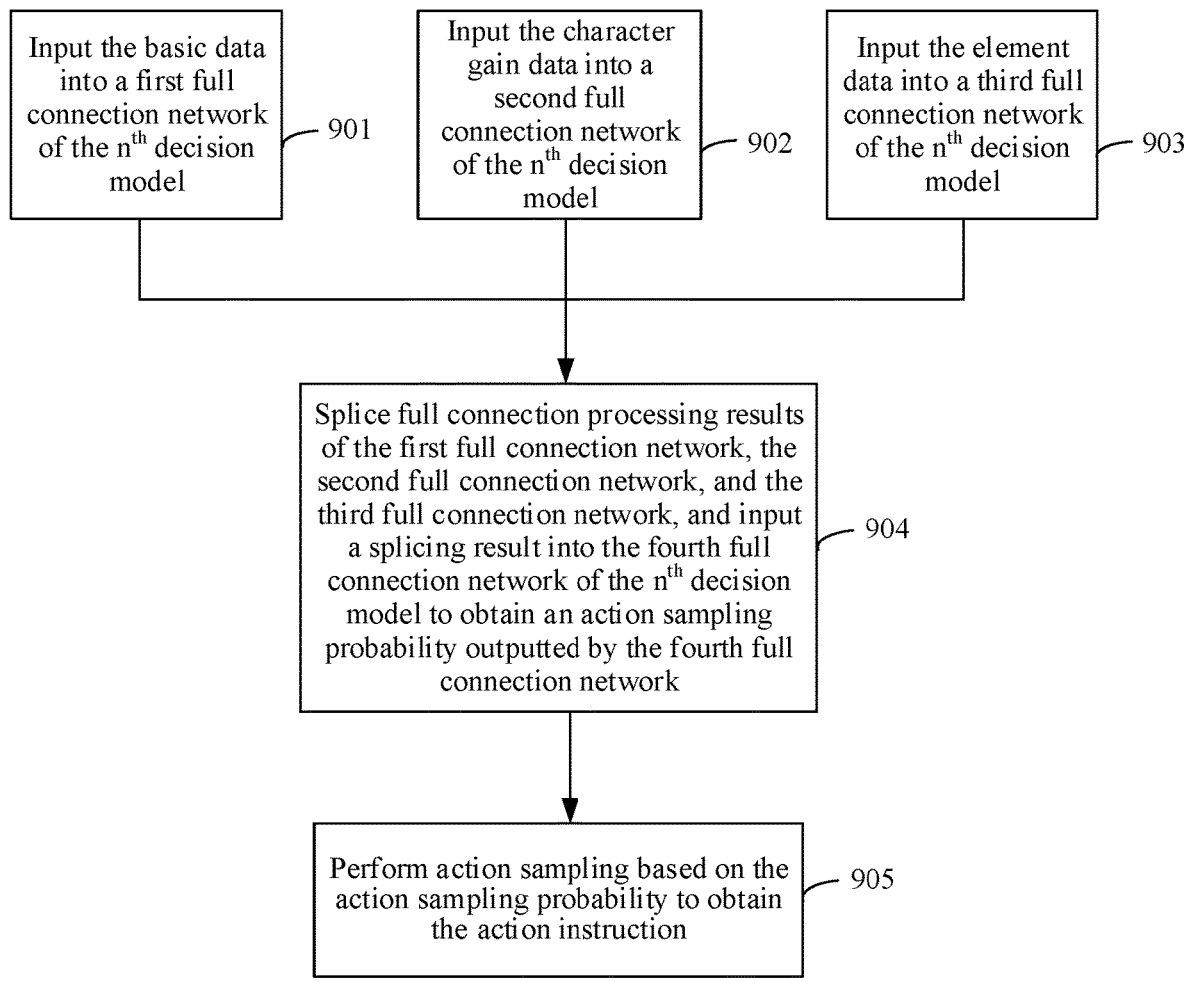
FIG. 9 shows a flowchart of a process of outputting an action instruction by a decision model based on battle state data according to an exemplary embodiment of this disclosure.

In a possible implementation, the $i^{th}$ battle state data includes basic data, character gain data, and element data. The $i^{th}$ battle state data is inputted into the decision model to obtain an action instruction. The output process of the action instruction is introduced below. FIG. 9 shows a flowchart of a process of outputting an action instruction by a decision model based on battle state data according to an exemplary embodiment of this disclosure.

Step 901: Input the basic data into a first full connection network of the $n^{th}$ decision model.

The basic data refers to data needed to build a game, such as game environment data, virtual character related data, and virtual prop related data.

In some implementations, the basic data includes environment values, skill IDs of the first virtual character and the second virtual character, psychic IDs used by the first virtual character and the second virtual character, scroll IDs used by the first virtual character and the second virtual character, and character IDs of the first virtual character and the second virtual character.

Figure 10:
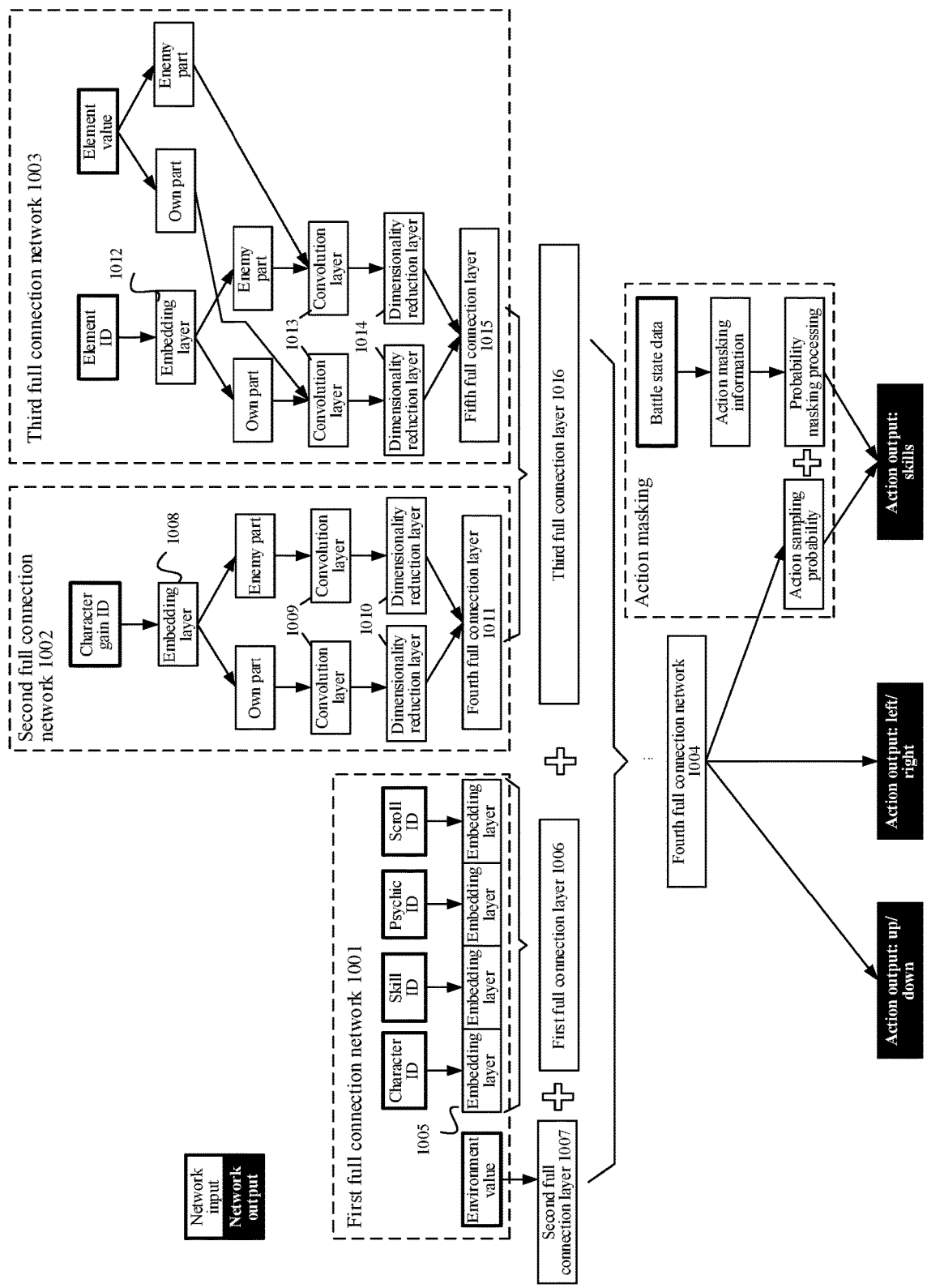
FIG. 10 shows a schematic diagram of a process of outputting an action instruction by a decision model based on battle state data according to an exemplary embodiment of this disclosure.

Exemplarily, as shown in FIG. 10, the computer device inputs the skill IDs, psychic IDs, scroll IDs, and character IDs of the first virtual character and the second virtual character into an embedding layer 1005, performs embedding processing, converts ID data into a numerical vector, and splices embedding results of the skill IDs, the psychic IDs, the scroll IDs, and the character IDs to form a first full connection layer 1006, while the computer device inputs environment values into a second full connection layer 1007 of a first full connection network 1001. Further, a full connection processing result of the first full connection layer 1006 and a full connection processing result of the second full connection layer 1007 are spliced to obtain a full connection processing result of the first full connection network 1001.

In some implementations, the splicing method may be addition or concatenation.

This embodiment of this disclosure is not limited thereto.

Step 902: Input the character gain data into a second full connection network of the $n^{th}$ decision model.

In some implementations, the character gain includes a character gain ID. The computer device obtains a list of character gain IDs of the first virtual character and the second virtual character. Different character gains correspond to different character gain IDs.

Exemplarily, as shown in FIG. 10, the computer device inputs the character gain ID into an embedding layer 1008 and converts the ID data into a numeric vector. Further, an own-party (first virtual character) character gain numerical vector and an enemy-party (second virtual character) character gain numerical vector are distinguished. The own-party character gain numerical vector and the enemy-party character gain numerical vector are inputted into a convolution layer 1009 for convolution processing. Results processed by the convolution layer 1009 are inputted into a dimensionality reduction layer 1010 for dimensionality reduction processing to obtain a dimensionality reduction processing result of the own-party character gain numerical vector and a dimensionality reduction processing result of the enemy-party character gain numerical vector. The dimensionality reduction processing result of the own-party character gain numerical vector and the dimensionality reduction processing result of the enemy-party character gain numerical vector are inputted into a fourth full connection layer 1011 of the second full connection network 1002 to obtain a full connection processing result of the second full connection network 1002.

Step 903: Input the element data into a third full connection network of the $n^{th}$ decision model.

In some implementations, the element data includes an element ID and an element value. The element is used for representing the manifestation of a skill. For example, the skill is to transmit a shock wave. The shock wave is shown in the form of a waveform in a game picture, and the waveform is the element. The element value is used for representing a state vector of the element. In some implementations, the state vector may be an element position, speed, and the like. For example, the state vector is a position, emission speed and the like of the shock wave.

Exemplarily, as shown in FIG. 10, the computer device obtains a list of element IDs. The list of element IDs includes element IDs and corresponding element values.

The computer device inputs the element ID into an embedding layer 1012, converts ID data into a numerical vector, and further distinguishes an own-party (first virtual character) element numerical vector and an enemy-party (second virtual character) element numerical vector. Also, the element values are distinguished into own-party element values and enemy-party element values. The foregoing own-party element value vector, own-party element values, enemy-party element value vector, and enemy-party element values are inputted into a convolution layer 1013 for convolution processing. Results processed by the convolution layer 1013 are inputted into a dimensionality reduction layer 1014 for dimensionality reduction processing to obtain a dimensionality reduction processing result of own-party element data and a dimensionality reduction processing result of enemy-party element data. The dimensionality reduction processing result of the own-party element data and the dimensionality reduction processing result of the enemy-party element data are inputted into a fifth full connection layer 1015 of the third full connection network 1003 to obtain a full connection processing result of the third full connection network 1003.

Step 904: Splice full connection processing results of the first full connection network, the second full connection network, and the third full connection network, and input a splicing result into the fourth full connection network of the $n^{th}$ decision model to obtain an action sampling probability outputted by the fourth full connection network.

Since the full connection processing results of the first full connection network, the second full connection network, and the third full connection network are different, the computer device first performs splicing processing thereon.

Exemplarily, as shown in FIG. 10, the computer device first splices the full connection processing results of the second full connection network 1002 and the third full connection network 1003 through a third full connection layer 1016 to obtain a full connection processing result corresponding to the third full connection layer 1016, then splices the full connection processing result with the first full connection network 1001, and inputs the spliced processing result into the fourth full connection network 1004 of the decision model to obtain an action sampling probability.

The action sampling probability is used for representing a probability that the first virtual character may act in the current battle state.

In some implementations, the splicing method may be addition or concatenation. This embodiment of this disclosure is not limited thereto.

In order to avoid the waste of computing resources due to the return of invalid actions by the client, the computer device performs probability masking processing on the action sampling probability exemplarily as shown in FIG. 10. The computer device determines action masking information based on the battle state data, and performs probability masking processing on the action sampling probability through the action masking information. The method is introduced below.

Step 905: Perform action sampling based on the action sampling probability to obtain the action instruction.

The computer device performs action sampling according to the outputted action sampling probability, and obtains the corresponding action instruction under the $i^{th}$ battle state data.

In a possible case, there are non-executable actions of the first virtual character in the current battle state. For example, when a skill is in a cooled state, the skill cannot be casted, and the computer device needs to perform action masking processing on the non-executable actions. The mode may include the following steps:

Step 1: Determine action masking information based on the $i^{th}$ battle state data, the action masking information being used for indicating a non-executable action of the first virtual character in the current battle state.

In a possible implementation, the computer device determines action masking information according to cooled states of skills, available skills, types of skills, skill levels, and the like in the battle state data.

Exemplarily, in the current battle state, when a certain skill is still being cooled or energy to use a certain skill is insufficient, the first virtual character cannot use the skill. At this moment, the action masking information is an unavailable skill of the first virtual character.

Exemplarily, in the current battle state, the first virtual character is attacked by the second virtual character and cannot move up and down, left and right. At this moment, the action masking information is a direction in which the first virtual character cannot move.

Step 2: Perform probability masking on the action sampling probability based on the action masking information, the probability masking being used for masking a sampling probability of the non-executable action of the first virtual character.

In order to avoid the waste of computing resources caused by the virtual character being unable to act due to the return of invalid actions by the client, the computer device performs probability masking on the action sampling probability according to the action masking information, namely masking a sampling probability of the non-executable action of the first virtual character.

Exemplarily, skill 1 has a sampling probability of 50%, skill 2 has a sampling probability of 10%, skill 3 has a sampling probability of 10%, and skill 4 has a sampling probability of 30%. According to the battle state data, the computer device may know that skill 3 is being cooled. Therefore, the determined action masking information is skill 3, and then the sampling probability of skill 3 is masked, that is, the decision model does not output an action instruction of skill 3.

Step 3: Perform action sampling based on the masked action sampling probability to obtain the action instruction.

In a possible implementation, the computer device samples an action with the highest probability from the masked action sampling probability to obtain the action instruction.

Exemplarily, the computer device performs action sampling according to the sampling probability of each skill after the probability masking processing. When skill 1 is sampled, the decision model outputs an action instruction of skill 1 to instruct the first client to control the first virtual character to cast skill 1.

In this embodiment, the action sampling probability outputted from the decision model is masked by the action masking information, so as to avoid returning invalid actions to the client, whereby the virtual character is unable to act to cause waste of computing resources.

To sum up, in this embodiment of this disclosure, in each round of iteration, $i^{th}$ battle state data is inputted into an $n^{th}$ decision model to obtain an action instruction outputted by the $n^{th}$ decision model. The action instruction is used for instructing a first client to control a first virtual character to act. After controlling the first virtual character to act, the first client returns collected $i+1^{th}$ battle state data, thereby learning and establishing a mapping relationship between a battle state and a battle action and training the $n^{th}$ decision model through the battle state data in a battle process to obtain an $n+1^{th}$ decision model. The decision models are trained through the battle state data in the battle process, the decision-making ability of the decision models is improved, and the decision models perform as well as real players, thereby enhancing the battle personification of the decision models.

Further, the computer device trains the decision model based on the first reward value and the second reward value. The first reward value is determined by changes of character attribute values of the first virtual character and the second virtual character in adjacent battle state data. The second reward value is determined by a battle winning or losing result, and the changes of the character attribute values in the battle state data may also reflect the battle winning or losing result to a certain extent. Therefore, in this embodiment of this disclosure, the computer device trains the decision model through the first reward value and the second reward value to achieve a victory-oriented purpose, thereby further enhancing the battle personification and strength of the decision model.

Further, the third reward value is introduced to train the decision model. The third reward value is determined by a rationality parameter. The rationality parameter is used for measuring the rationality of an action represented by an action instruction executed by a virtual object indicated by the decision model in the battle state. Different rationality parameters lead to different third reward values, thus guiding the decision model to learn personified basic rules and playing methods, and further enhancing the battle personification of the decision model. In addition, in different training stages, the decision model is trained by different reward values to achieve different training purposes. That is, when the number of iterations does not reach the number threshold, the computer device trains the decision model based on the basic reward value determined by the first reward value and the second reward value and the auxiliary reward value determined by the third reward value, whereby the battle personification of the trained decision model is emphasized in the low-round iteration process. When the number of iterations reaches the number threshold, the computer device trains the decision model based on the basic reward value determined by the first reward value and the second reward value, whereby the strength of the trained decision model is emphasized in the high-round iteration process, with the purpose of victory.

Further, the computer device adds the trained decision model to the second model pool, and samples the opponent decision model from the second model based on the historical winning rate of the decision model. As the historical winning rate of the decision model in the second model pool is higher, the probability that the decision model is sampled by the computer device as the opponent decision model is higher. Training through the opponent decision model with high winning rate is beneficial to improve the strength of the decision model and further perform as well as real players. In addition, when the number of battles between the opponent decision model in the second model pool and the decision model in the first model pool reaches a number threshold, the computer device will re-sample the opponent decision model from the second model pool to ensure the comprehensiveness of decision model training, and also, update the historical winning rate of the decision model in the second model pool based on the battle result to ensure the accuracy of the decision model training.

Further, the computer device inputs the basic data, the character gain data, and the element data contained in the battle state data into the decision model, and outputs the action sampling probability. In order to avoid the waste of computing resources due to the return of invalid actions by the client, the computer device performs probability masking processing on the outputted action sampling probability through the action masking information, and then obtains a final action instruction outputted by the decision model.

In the foregoing embodiment, the decision model training method is illustrated by being applied to a game. In another possible scene, the decision model training method provided by this embodiment of this disclosure may be applied to other industrial fields, such as an intelligent security robot.

When the method is applied to an intelligent security robot, a decision model corresponding to the robot is obtained by training, whereby the robot may attack or defend based on own features when making decision actions indicated by the corresponding decision model.

In a possible implementation, when training the decision model corresponding to the intelligent security robot, a first model pool and a second model pool are constructed. The first model pool includes at least one decision model, the second model pool includes a decision model trained in a historical iteration process, and an opponent decision model is selected from the second model pool to train with the decision model in the first model pool. The action instructions outputted by the decision model and the opponent decision model are used for instructing the corresponding robot to act and attack or defend. The decision model is trained for multiple rounds based on state data in the process of attack or defense, so as to improve the decision-making ability of the decision model, whereby the robot performs security based on own attack characteristics or defense characteristics in different cases, thereby improving the security effect of the intelligent security robot.

The method is illustrated above by being only applied to the intelligent security robot, but is not limited thereto. The decision model training method provided by this embodiment of this disclosure may be applied to any object requiring automatic fighting.

The following describes apparatus embodiments of this disclosure, which may be used for executing the method embodiments of this disclosure. Details not disclosed in the apparatus embodiments of this disclosure may be similar to those in the method embodiments of this disclosure.

Figure 11:
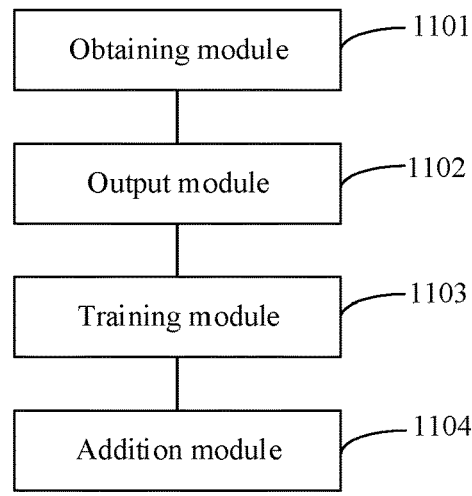
FIG. 11 shows a structural block diagram of a decision model training apparatus according to an exemplary embodiment of this disclosure.

FIG. 11 shows a structural block diagram of a decision model training apparatus according to an exemplary embodiment of this disclosure. The apparatus includes:

an obtaining module 1101, configured to obtain a first model pool, the first model pool including at least one decision model for indicating a battle policy adopted by a virtual character in a battle;

an output module 1102, configured to input, in an $n^{th}$ iteration process, $i^{th}$ battle state data into an $n^{th}$ decision model to obtain an action instruction outputted by the $n^{th}$ decision model, the $i^{th}$ battle state data being used for representing a battle state at an $i^{th}$ battle time in the battle process, and the action instruction being used for instructing a first client to control a first virtual character to act and returning $i+1^{th}$ battle state data collected by the first virtual character after acting;

a training module 1103, configured to train the $n^{th}$ decision model based on battle state data in the battle process to obtain an $n+1^{th}$ decision model; and an addition module 1104, configured to add the $n+1^{th}$ decision model to the first model pool.

In some implementations, the training module 1103 is further configured to:

determine a first reward value based on the $i^{th}$ battle state data and the $i+1^{th}$ battle state data;

determine a second reward value based on a battle result, the battle result being used for indicating winning or losing of the battle; and train the $n^{th}$ decision model based on the first reward value and the second reward value to obtain the $n+1^{th}$ decision model.

In some implementations, the training module 1103 is further configured to:

obtain an $i^{th}$ character attribute value in the $i^{th}$ battle state data and an $i+1^{th}$ character attribute value in the $i+1^{th}$ battle state data, the character attribute values including attribute values of the first virtual character and a second virtual character, and the second virtual character being a virtual character battling against the first virtual character; and determine the first reward value based on an attribute value change situation between the $i^{th}$ character attribute value and the $i+1^{th}$ character attribute value.

In some implementations, the training module 1103 is further configured to:
train, when the number of iterations reaches a number threshold, the $n^{th}$ decision model based on the first reward value and the second reward value to obtain the $n+1^{th}$ decision model.

In some implementations, the training module 1103 is further configured to:
determine, when the number of iterations does not reach the number threshold, a third reward value based on the battle state data and the action instruction; and
train the $n^{th}$ decision model based on the first reward value, the second reward value, and the third reward value to obtain the $n+1^{th}$ decision model.

In some implementations, the training module 1103 is further configured to:
determine, when the number of iterations does not reach the number threshold, a rationality parameter based on the battle state data and the action instruction, the rationality parameter being used for representing the rationality of the virtual character executing an action represented by the action instruction under the battle state represented by the battle state data; and
determine the third reward value based on the rationality parameter, the third reward value being positively correlated with the rationality parameter.

In some implementations, the training module 1103 is further configured to:
determine a basic reward value based on the first reward value, the second reward value, and a basic reward weight;
determine an auxiliary reward value based on the third reward value and an auxiliary reward weight, the auxiliary reward weight being smaller than the basic reward weight, and the auxiliary reward weight being negatively correlated with the number of iterations; and
train the $n^{th}$ decision model based on the basic reward value and the auxiliary reward value to obtain the $n+1^{th}$ decision model.

In some implementations, the apparatus further includes:
a sampling module, configured to sample an opponent decision model from a second model pool, the second model pool including at least one decision model trained in a historical iteration process.

The output module 1102 is further configured to input, in an $n^{th}$ iteration process, $i^{th}$ opponent battle state data into the opponent decision model to obtain an opponent action instruction outputted by the opponent decision model, the opponent action instruction being used for instructing a second client to control a second virtual character to act and returning $i+1^{th}$ opponent battle state data collected by the second virtual character after acting, and the second virtual character being a virtual character battling against the first virtual character.

In some implementations, the sampling module is configured to:
sample the opponent decision model from the second model pool based on a historical winning rate corresponding to each decision model in the second model pool, a sampling rate of the decision model being positively correlated with the historical winning rate.

The apparatus further includes:

an update module, configured to update the historical winning rate of the opponent decision model based on a battle result of the first virtual character and the second virtual character.

In some implementations, the sampling module is further configured to:
re-sample the opponent decision model from the second model pool when the number of battles reaches a number threshold, the number of battles referring to the number of battles using the opponent decision model.

In some implementations,
the addition module 1104 is further configured to add the $n+1^{th}$ decision model to the second model pool.

In some implementations, the $i^{th}$ battle state data includes basic data, character gain data, and element data.

The output module 1102 is further configured to:
input the basic data into a first full connection network of the $n^{th}$ decision model;
input the character gain data into a second full connection network of the $n^{th}$ decision model;
input the element data into a third full connection network of the $n^{th}$ decision model;
splice full connection processing results of the first full connection network, the second full connection network, and the third full connection network, and input a splicing result into the fourth full connection network of the $n^{th}$ decision model to obtain an action sampling probability outputted by the fourth full connection network; and
perform action sampling based on the action sampling probability to obtain the action instruction.

In some implementations, the apparatus further includes:
an action determination module, configured to determine action masking information based on the $i^{th}$ battle state data, the action masking information being used for indicating a non-executable action of the first virtual character in the battle state represented by the $i^{th}$ battle state data; and
a masking module, configured to perform probability masking on the action sampling probability based on the action masking information, the probability masking being used for masking a sampling probability of the non-executable action of the first virtual character.

The sampling module is further configured to:
perform action sampling based on the masked action sampling probability to obtain the action instruction.

In some implementations, the apparatus further includes:
a model determination module, configured to determine, when an iterative training end condition is satisfied, the decision model obtained by the last round of training in the first model pool as an disclosure decision model.

To sum up, in this embodiment of this disclosure, in each round of iteration, $i^{th}$ battle state data is inputted into an $n^{th}$ decision model to obtain an action instruction outputted by the $n^{th}$ decision model. The action instruction is used for instructing a first client to control a first virtual character to act. After controlling the first virtual character to act, the first client returns collected $i+1^{th}$ battle state data, thereby learning and establishing a mapping relationship between a battle state and a battle action and training the $n^{th}$ decision model through the battle state data in a battle process to obtain an $n+1^{th}$ decision model. The decision models are trained through the battle state data in the battle process, the decision-making ability of the decision models is improved, and the decision models perform as well as real players, thereby enhancing the battle personification of the decision models.

The apparatus provided in the foregoing embodiments is illustrated with an example of division of the foregoing function modules. In practical disclosure, the foregoing functions may be allocated to and completed by different function modules according to requirements. That is, the internal structure of the apparatus is divided into different function modules, so as to complete all or part of the functions described above. In addition, the apparatus provided in the foregoing embodiments and the method embodiments fall within the same conception. A specific implementation process is described in detail with reference to the method embodiments.

The term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry on the same or different integrated circuit.

Figure 12:
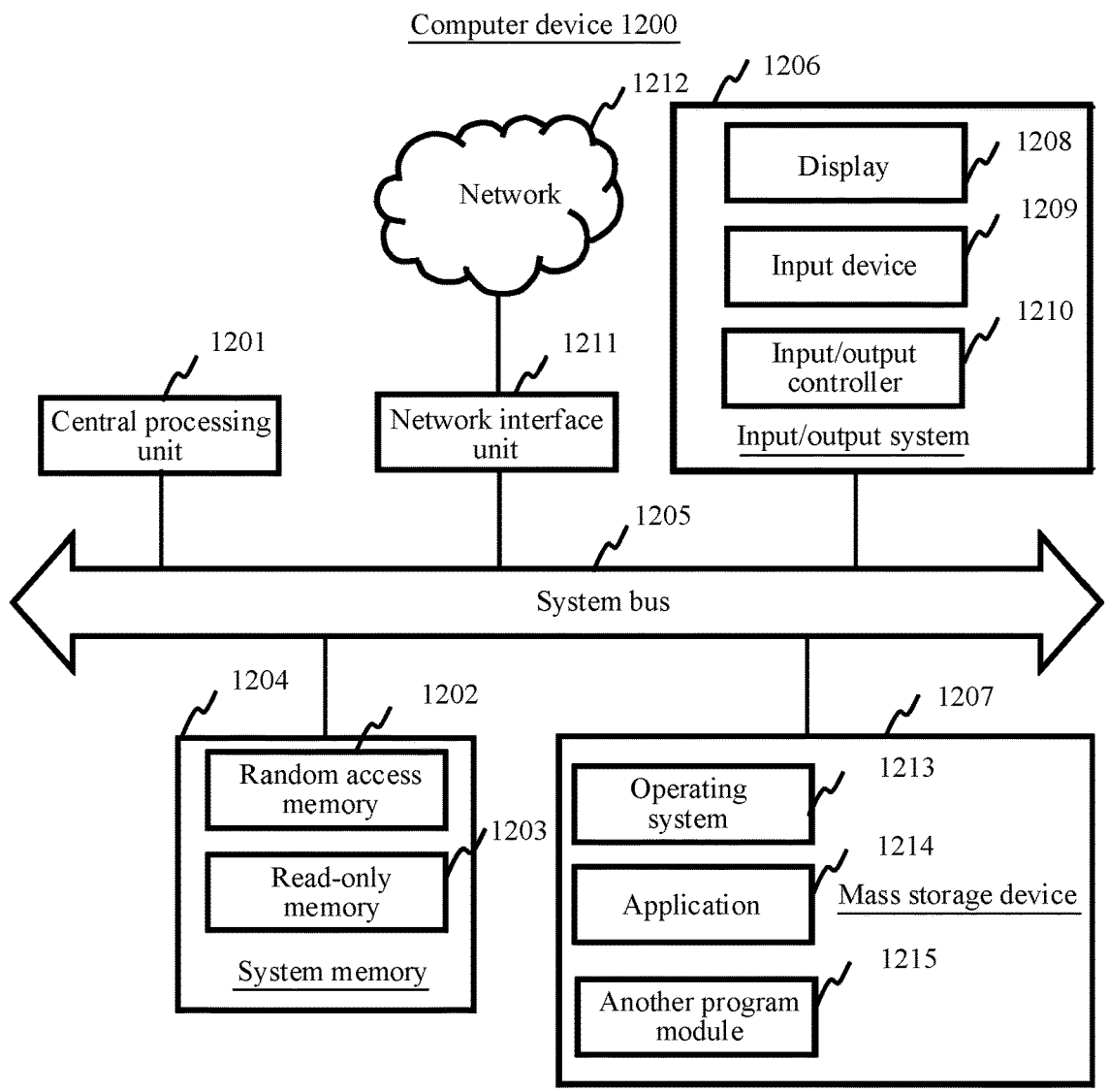
FIG. 12 shows a structural block diagram of a computer device according to an exemplary embodiment of this disclosure.

FIG. 12 shows a structural block diagram of a computer device according to an exemplary embodiment of this disclosure. The computer device may be configured to train the foregoing decision model.

The computer device 1200 includes a central processing unit (CPU) 1201, a system memory 1204 including a random access memory (RAM) 1202 and a read-only memory (ROM) 1203, and a system bus 1205 connecting the system memory 1204 and the CPU 1201. The computer device 1200 further includes a basic I/O system 1206 that facilitates transfer of information between components within a server, and a mass storage device 1207 that stores an operating system 1213, an disclosure 1214, and another program module 1215.

The basic I/O system 1206 includes a display 1208 for displaying information and an input device 1209 such as a mouse or a keyboard for inputting information by a user. The display 1208 and the input device 1209 are connected to the CPU 1201 through an I/O controller 1210 which is connected to the system bus 1205. The basic I/O system 1206 may further include the I/O controller 1210 for receiving and processing input from multiple other devices, such as a keyboard, a mouse, or an electronic stylus. Similarly, the I/O controller 1210 also provides output to a display screen, a printer, or another type of output device.

The mass storage device 1207 is connected to the CPU 1201 through a mass storage controller (not shown) connected to the system bus 1205. The mass storage device 1207 and a computer-readable storage medium associated therewith provide non-transitory storage for the computer device 1200. That is to say, the mass storage device 1207 may include a computer-readable storage medium (not shown) such as a hard disk or a compact disc read-only memory (CD-ROM) drive.

Without loss of generality, the computer-readable storage medium may include a computer storage medium and a communication medium. The computer storage medium includes transitory and non-transitory media, and removable and non-removable media implemented by using any method or technology used for storing information such as computer-readable storage instructions, data structures, program modules, or other data. The computer storage medium includes a RAM, a ROM, an erasable programmable read only memory (EPROM), an electrically-erasable programmable read-only memory (EEPROM), a flash memory or another solid-state memory technology, a CD-ROM, a digital versatile disc (DVD) or another optical memory, a tape cartridge, a magnetic tape, a magnetic disk memory, or another magnetic storage device. Certainly, a person skilled in the art may learn that the computer storage medium is not limited to the foregoing several types. The foregoing system memory 1204 and mass storage device 1207 may be collectively referred to as a memory.

The memory stores one or more programs. The one or more programs are configured to be executed by one or more CPUs 1201. The one or more programs include instructions for implementing the foregoing method embodiments. The CPU 1201 executes the one or more programs to implement the method provided in the foregoing various method embodiments.

According to the various embodiments of this disclosure, the computer device 1200 may further be connected, through a network such as the Internet, to a remote server on the network and run. That is, the computer device 1200 may be connected to a network 1212 through a network interface unit 1211 which is connected to the system bus 1205, or may be connected to another type of network or remote server system (not shown) by using the network interface unit 1211.

The memory further includes one or more programs. The one or more programs are stored in the memory. The one or more programs include steps to be executed by the computer device in the method provided in this embodiment of this disclosure.

This embodiment of this disclosure also provides a computer-readable storage medium. The computer-readable storage medium stores at least one instruction. The at least one instruction is loaded and executed by a processor to implement the decision model training method according to the above various embodiments.

According to an aspect of this disclosure, a computer program product or computer program is provided. The computer program product or computer program includes computer instructions. The computer instructions are stored in a computer-readable storage medium. A processor of a computer device reads the computer instructions from the computer-readable storage medium. The processor executes the computer instructions, whereby the computer device performs the decision model training method provided in various optional implementations of the foregoing aspects.

What is claimed is:

1. A decision model training method, performed by a computer device, the method comprising:

obtaining a first model pool, the first model pool comprising at least one decision model for indicating a battle policy adopted by a virtual character in a battle;

inputting, in an $n^{th}$ iteration process, $i^{th}$ battle state data into an $n^{th}$ decision model to obtain an action instruction outputted by the $n^{th}$ decision model, the $i^{th}$ battle state data being for representing a battle state at an $i^{th}$ battle time in a battle process, and the action instruction being for instructing a first client to control a first virtual character to act and return i+1th battle state data collected by the first virtual character after acting, n and i being a positive integer;

sampling an opponent decision model from a second model pool, the second model pool comprising at least one decision model trained in a historical iteration process;

inputting, in the $n^{th}$ iteration process, $i^{th}$ opponent battle state data into the opponent decision model to obtain an opponent action instruction outputted by the opponent decision model, the opponent action instruction being for instructing a second client to control a second virtual character to act and return i+1$^{th}$ opponent battle state data collected by the second virtual character after acting, and the second virtual character being a virtual character battling against the first virtual character;

training the $n^{th}$ decision model based on battle state data in the battle process to obtain an $n+1^{th}$ decision model, the battle state data comprising the i+1$^{th}$ battle state data and the i+1$^{th}$ opponent battle state data; and adding the n+1$^{th}$ decision model to the first model pool and the second model pool.

2. The method according to claim 1, wherein the training the $n^{th}$ decision model to obtain the n+1$^{th}$ decision model comprises:

determining a first reward value based on the $i^{th}$ battle state data and the i+1$^{th}$ battle state data;

determining a second reward value based on a battle result, the battle result being for indicating winning or losing of the battle; and training the $n^{th}$ decision model based on the first reward value and the second reward value to obtain the n+1$^{th}$ decision model.

3. The method according to claim 2, wherein the determining the first reward value based on the $i^{th}$ battle state data and the i+1$^{th}$ battle state data comprises:

obtaining an $i^{th}$ character attribute value in the $i^{th}$ battle state data and an i+1$^{th}$ character attribute value in the i+1$^{th}$ battle state data, the character attribute value comprising an attribute value of the first virtual character and an attribute value of a second virtual character, and the second virtual character being a virtual character battling against the first virtual character; and determining the first reward value based on an attribute value change situation between the $i^{th}$ character attribute value and the i+1$^{th}$ character attribute value.

4. The method according to claim 2, wherein the training the $n^{th}$ decision model to obtain the n+1$^{th}$ decision model comprises:

training, in response to a number of iterations reaching a number threshold, the $n^{th}$ decision model based on the first reward value and the second reward value to obtain the n+1$^{th}$ decision model.

5. The method according to claim 4, wherein the training the $n^{th}$ decision model to obtain the n+1$^{th}$ decision model further comprises:

determining, in response to the number of iterations failing to reach the number threshold, a third reward value based on the battle state data and the action instruction; and training the $n^{th}$ decision model based on the first reward value, the second reward value, and the third reward value to obtain the n+1$^{th}$ decision model.

6. The method according to claim 5, wherein the determining the third reward value comprises:

determining, in response to the number of iterations failing to reach the number threshold, a rationality parameter based on the battle state data and the action instruction, the rationality parameter being for representing rationality of the virtual character executing an action represented by the action instruction under the battle state represented by the battle state data; and determining the third reward value based on the rationality parameter, the third reward value being positively correlated with the rationality parameter.

7. The method according to claim 5, wherein the training the $n^{th}$ decision model to obtain the n+1$^{th}$ decision model comprises:

determining a basic reward value based on the first reward value, the second reward value, and a basic reward weight;

determining an auxiliary reward value based on the third reward value and an auxiliary reward weight, the auxiliary reward weight being less than the basic reward weight, and the auxiliary reward weight being negatively correlated with the number of iterations; and training the $n^{th}$ decision model based on the basic reward value and the auxiliary reward value to obtain the n+1$^{th}$ decision model.

8. The method according to claim 1, wherein the sampling the opponent decision model from a second model pool comprises:

sampling the opponent decision model from the second model pool based on a historical winning rate corresponding to each of decision models in the second model pool, a sampling rate of the decision model being positively correlated with the historical winning rate.

9. The method according to claim 8, wherein the method further comprises:

updating the historical winning rate of the opponent decision model based on a battle result of the first virtual character and the second virtual character.

10. The method according to claim 1, wherein the method further comprises:

re-sampling the opponent decision model from the second model pool in response to a number of battles reaching a number threshold, the number of battles referring to the number of battles using the opponent decision model.

11. The method according to claim 1, wherein the $i^{th}$ battle state data comprises basic data, character gain data, and element data, and the inputting the $i^{th}$ battle state data into the $n^{th}$ decision model to obtain the action instruction outputted by the $n^{th}$ decision model comprises:

inputting the basic data into a first full connection network of the $n^{th}$ decision model;

inputting the character gain data into a second full connection network of the $n^{th}$ decision model;

inputting the element data into a third full connection network of the $n^{th}$ decision model;

splicing full connection processing results of the first full connection network, the second full connection network, and the third full connection network;

inputting a splicing result into a fourth full connection network of the $n^{th}$ decision model to obtain an action sampling probability outputted by the fourth full connection network; and performing action sampling based on the action sampling probability to obtain the action instruction.

12. The method according to claim 11, wherein the method further comprises:

determining action masking information based on the $i^{th}$ battle state data, the action masking information being for indicating a non-executable action of the first virtual character in the battle state represented by the $i^{th}$ battle state data;

performing probability masking on the action sampling probability based on the action masking information, the probability masking being for masking a sampling probability of the non-executable action of the first virtual character; and the performing action sampling based on the action sampling probability to obtain the action instruction comprises:

performing action sampling based on the masked action sampling probability to obtain the action instruction.

13. The method according to claim 1, wherein the method further comprises:

determining, in response to an iterative training end condition being satisfied, the decision model obtained by the last round of training in the first model pool as an disclosure decision model.

14. A decision model training apparatus, comprising:

a memory operable to store computer-readable instructions; and a processor circuitry operable to read the computer-readable instructions, the processor circuitry when executing the computer-readable instructions is configured to:

obtain a first model pool, the first model pool comprising at least one decision model for indicating a battle policy adopted by a virtual character in a battle;

input, in an $n^{th}$ iteration process, $i^{th}$ battle state data into an $n^{th}$ decision model to obtain an action instruction outputted by the $n^{th}$ decision model, the $i^{th}$ battle state data being for representing a battle state at an $i^{th}$ battle time in a battle process, and the action instruction being for instructing a first client to control a first virtual character to act and return $i+1^{th}$ battle state data collected by the first virtual character after acting, n and i being a positive integer;

sample an opponent decision model from a second model pool, the second model pool comprising at least one decision model trained in a historical iteration process;

input, in the $n^{th}$ iteration process, $i^{th}$ opponent battle state data into the opponent decision model to obtain an opponent action instruction outputted by the opponent decision model, the opponent action instruction being for instructing a second client to control a second virtual character to act and return $i+1^{th}$ opponent battle state data collected by the second virtual character after acting, and the second virtual character being a virtual character battling against the first virtual character;

train the $n^{th}$ decision model based on battle state data in the battle process to obtain an $n+1^{th}$ decision model, the battle state data comprising the $i+1^{th}$ battle state data and the $i+1^{th}$ opponent battle state data; and add the $n+1^{th}$ decision model to the first model pool and the second model pool.

15. The apparatus according to claim 14, wherein the processor circuitry is configured to:

determine a first reward value based on the $i^{th}$ battle state data and the $i+1^{th}$ battle state data;

determine a second reward value based on a battle result, the battle result being for indicating winning or losing of the battle; and train the $n^{th}$ decision model based on the first reward value and the second reward value to obtain the $n+1^{th}$ decision model.

16. The apparatus according to claim 14, wherein the processor circuitry is configured to:

sample an opponent decision model from a second model pool, the second model pool comprising at least one decision model trained in a historical iteration process; and input, in the $n^{th}$ iteration process, $i^{th}$ opponent battle state data into the opponent decision model to obtain an opponent action instruction outputted by the opponent decision model, the opponent action instruction being for instructing a second client to control a second virtual character to act and return $i+1^{th}$ opponent battle state data collected by the second virtual character after acting, and the second virtual character being a virtual character battling against the first virtual character.

17. The apparatus according to claim 14, wherein the $i^{th}$ battle state data comprises basic data, character gain data, and element data, and the processor circuitry is configured to:

input the basic data into a first full connection network of the $n^{th}$ decision model;

input the character gain data into a second full connection network of the $n^{th}$ decision model;

input the element data into a third full connection network of the $n^{th}$ decision model;

splice full connection processing results of the first full connection network, the second full connection network, and the third full connection network;

input a splicing result into a fourth full connection network of the $n^{th}$ decision model to obtain an action sampling probability outputted by the fourth full connection network; and perform action sampling based on the action sampling probability to obtain the action instruction.

18. A non-transitory machine-readable media, having instructions stored on the machine-readable media, the instructions configured to, when executed, cause a machine to:

obtain a first model pool, the first model pool comprising at least one decision model for indicating a battle policy adopted by a virtual character in a battle;

input, in an $n^{th}$ iteration process, $i^{th}$ battle state data into an $n^{th}$ decision model to obtain an action instruction outputted by the $n^{th}$ decision model, the $i^{th}$ battle state data being for representing a battle state at an $i^{th}$ battle time in a battle process, and the action instruction being for instructing a first client to control a first virtual character to act and return $i+1^{th}$ battle state data collected by the first virtual character after acting, n and i being a positive integer;

sample an opponent decision model from a second model pool, the second model pool comprising at least one decision model trained in a historical iteration process;

input, in the $n^{th}$ iteration process, $i^{th}$ opponent battle state data into the opponent decision model to obtain an opponent action instruction outputted by the opponent decision model, the opponent action instruction being for instructing a second client to control a second virtual character to act and return $i+1^{th}$ opponent battle state data collected by the second virtual character after acting, and the second virtual character being a virtual character battling against the first virtual character;

train the $n^{th}$ decision model based on battle state data in the battle process to obtain an $n+1^{th}$ decision model, the battle state data comprising the $i+1^{th}$ battle state data and the $i+1^{th}$ opponent battle state data; and add the $n+1^{th}$ decision model to the first model pool and the second model pool.

* * * * *